US012793167B2

(12) United States Patent
Singh et al.

(10) Patent No.: US 12,793,167 B2
(45) Date of Patent: Nov. 10, 2026

(54) GENERATING POLYNOMIAL IMPLICIT NEURAL REPRESENTATIONS FOR LARGE DIVERSE DATASETS

(71) Applicants: Rajhans Singh, Tempe, AZ (US); Ankita Shukla, Tempe, AZ (US); Pavan Turaga, Chandler, AZ (US)

(72) Inventors: Rajhans Singh, Tempe, AZ (US); Ankita Shukla, Tempe, AZ (US); Pavan Turaga, Chandler, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 186 days.

(21) Appl. No.: 18/735,585

(22) Filed: Jun. 6, 2024

(65) Prior Publication Data

US 2024/0412319 A1 Dec. 12, 2024

Related U.S. Application Data

(60) Provisional application No. 63/506,554, filed on Jun. 6, 2023.

(51) Int. Cl.
*G06T 3/02* (2024.01)
*G06N 3/04* (2023.01)
(Continued)

(52) U.S. Cl.
CPC ................. *G06T 3/02* (2024.01); *G06N 3/04* (2013.01); *G06N 3/045* (2023.01); *G06N 3/048* (2023.01);
(Continued)

(58) Field of Classification Search
CPC ........... G06T 3/02; G06T 3/4046; G06T 5/60; G06T 2207/20081; G06T 2207/20084;
(Continued)

(56) References Cited

U.S. PATENT DOCUMENTS

| | | | |
|---|---|---|---|
| 10,275,713 | B2 | 4/2019 | Bhat et al. |
| 11,508,167 | B2 | 11/2022 | Deng et al. |

(Continued)

FOREIGN PATENT DOCUMENTS

| | | |
|---|---|---|
| WO | 2021243903 A1 | 12/2021 |

OTHER PUBLICATIONS

Cai, Zhicheng, et al. "Split-layer: Enhancing implicit neural representation by maximizing the dimensionality of feature space." Proceedings of the AAAI Conference on Artificial Intelligence. vol. 40, No. 4 (Year: 2026).*

(Continued)

*Primary Examiner* — Scott A Rogers
(74) *Attorney, Agent, or Firm* — Shumaker & Sieffert, P.A.

(57) ABSTRACT

A Polynomial Implicit Neural Representation generator framework (Poly-INR framework) may be trained to generate polynomial implicit neural representations for large diverse training datasets and learn a polynomial order representing the training datasets. The Poly-INR framework may include a mapping network and a synthesis network. The mapping network may map latent code extracted from the plurality of input images of the training dataset into an affine parameters space and generate affine transformation parameters from the affine parameters space. The synthesis network may obtain the affine transformation parameters and pixel coordinate locations from the mapping network and parameterize the affine transformation parameters using the latent code extracted from the plurality of input images of the training dataset as a known distribution. The Poly-INR framework may train an AI model to learn the polynomial order representing the training dataset from the affine transformation parameters parameterized and output the AI model.

20 Claims, 17 Drawing Sheets

(51) Int. Cl.
*G06N 3/045* (2023.01)
*G06N 3/048* (2023.01)
*G06T 3/4046* (2024.01)

(52) U.S. Cl.
CPC ........................ *G06T 3/4046* (2013.01); *G06T 2207/20081* (2013.01); *G06T 2207/20084* (2013.01)

(58) Field of Classification Search
CPC .............. G06N 3/04–0499; G06N 3/08–0985; G06N 20/00
See application file for complete search history.

(56) References Cited

U.S. PATENT DOCUMENTS

| | | | | |
|---|---|---|---|---|
| 12,141,941 | B2 * | 11/2024 | Karras .................. | G06T 3/4046 |
| 2021/0350620 | A1 | 11/2021 | Bronstein et al. | |
| 2022/0122250 | A1 | 4/2022 | Besson et al. | |
| 2022/0138193 | A1 | 5/2022 | Xu et al. | |
| 2022/0147790 | A1 * | 5/2022 | Zafeiriou ............... | G06N 3/048 |
| 2024/0395016 | A1 | 11/2024 | Singh et al. | |
| 2025/0017694 | A1 | 1/2025 | Gandrud et al. | |
| 2025/0111281 | A1 * | 4/2025 | Papa ...................... | G16H 30/40 |

OTHER PUBLICATIONS

Nath, Utkarsh, et al. "Polynomial implicit neural framework for promoting shape awareness in generative models." International Journal of Computer Vision 133(5), pp. 2967-2995 (Year: 2025).*

Alajlan et al., "Geometry-based image retrieval in binary image databases", IEEE transactions on pattern analysis and machine intelligence, vol. 30, No. 6, Jun. 2008, p. 1003-1013.

Anokhin et al., "Image generators with conditionally-independent pixel synthesis", Proceedings of the IEEE/CVF Conference on Computer Vision and Pattern Recognition, Nov. 27, 2020, p. 14278-14287.

Arjovsky et al., "Wasserstein generative adversarial networks", International conference on machine learning, PMLR, Jul. 17, 2017, p. 214-223.

Barron et al., "Mip-NeRF 360: Unbounded anti-aliased neural radiance fields", Proceedings of the IEEE/CVF Conference on Computer Vision and Pattern Recognition, Mar. 25, 2022, p. 5470-5479.

Brock et al., "Large scale gan training for high fidelity natural image synthesis", arXiv:1809.11096v1, Sep. 28, 2018, 29 pp.

Chen et al., "DeepLab: Semantic Image Segmentation with Deep Convolutional Nets, Atrous Convolution, and Fully Connected CRFs", IEEE transactions on pattern analysis and machine intelligence, vol. 40, No. 4, IEEE, Apr. 27, 2017, p. 834-848.

Chen et al., "Encoder-decoder with atrous separable convolution for semantic image segmentation", Proceedings of the European conference on computer vision (ECCV), Aug. 22, 2018, p. 801-818.

Chen et al., "InfoGAN: Interpretable Representation Learning by Information Maximizing Generative Adversarial Nets", 30th Conference on Neural Information Processing Systems (NIPS 2016), Jun. 12, 2016, p. 2180-2188.

Chen et al., "Learning continuous image representation with local implicit image function", Proceedings of the IEEE/CVF conference on computer vision and pattern recognition, Apr. 1, 2021, p. 8628-8638.

Chen et al., "Searching for efficient multi-scale architectures for dense image prediction", 32nd Conference on Neural Information Processing Systems (NeurIPS 2018), Sep. 11, 2018, 12 pp.

Cheng et al., "Learning rotation-invariant convolutional neural networks for object detection in vhr optical remote sensing images", IEEE Transactions on Geoscience and Remote Sensing, vol. 54, No. 12, IEEE, Sep. 5, 2016, p. 7405-7415.

Chng et al., "Gaussian activated neural radiance fields for high fidelity reconstruction and pose estimation", Computer Vision—ECCV 2022: 17th European Conference, Springer, Oct. 23, 2022, p. 264-280.

Chong et al., "Translation and scale invariants of legendre moments", Pattern recognition, vol. 37, No. 1, Elsevier, Jun. 30, 2003, p. 119-129.

Cordts et al., "The cityscapes dataset for semantic urban scene understanding", Proceedings of the IEEE conference on computer vision and pattern recognition, Apr. 7, 2016, p. 3213-3223.

Dai et al., "Deformable convolutional networks", Proceedings of the IEEE international conference on computer vision, IEEE, Jun. 5, 2017, p. 764-773.

Deng et al., "Imagenet: A large-scale hierarchical image database", 2009 IEEE conference on computer vision and pattern recognition, IEEE, Jun. 20, 2009, p. 248-255.

Dhariwal et al., "Diffusion models beat gans on image synthesis", 35th Conference on Neural Information Processing Systems (NeurIPS 2021), vol. 34, Dec. 6, 2021, p. 8780-8794.

Dosovitskiy et al., "An image is worth 16x16 words: Transformers for image recognition at scale", arXiv:2010.11929v2, Jun. 3, 2021, 22 pp.

Elad et al., "On bending invariant signatures for surfaces", IEEE Transactions on pattern analysis and machine intelligence, vol. 25, No. 10, IEEE, Sep. 29, 2003, p. 1285-1295.

Everingham et al., "The pascal visual object classes challenge: A retrospective", International journal of computer vision, vol. 111, No. 1, Jan. 2015, p. 98-136.

Flusser et al., "Moment Forms Invariant to Rotation and Blur in Arbitrary Number of Dimensions", IEEE Transactions on Pattern Analysis and Machine Intelligence, vol. 25, No. 2, IEEE, Feb. 19, 2003, p. 234-246.

Flusser et al., "Moments and moment invariants in pattern recognition", vol. 46, No. 1, John Wiley & Sons, Dec. 14, 2009, 312 pp.

Flusser et al., "Pattern recognition by affine moment invariants", vol. 26, No. 1, Pattern Recognition Society, Jun. 2, 1992, pp. 167-174.

Follmann et al., "A rotationally-invariant convolution module by feature map back-rotation", 2018 IEEE Winter Conference on Applications of Computer Vision, IEEE, Mar. 12, 2018, p. 784-792.

Fons et al., "HyperTime: Implicit Neural Representation for Time Series", arXiv:2208.05836v1, Aug. 11, 2022, 13 pp.

Foulonneau et al., "Affine-invariant geometric shape priors for region-based active contours", IEEE transactions on pattern analysis and machine intelligence, vol. 28, No. 8, IEEE, Aug. 31, 2006, p. 1352-1357.

Fu et al., "Panoptic nerf: 3d-to-2d label transfer for panoptic urban scene segmentation", 2022 International Conference on 3D Vision (3DV), IEEE, Sep. 12, 2022, pp. 301-311.

Gansbeke et al., "Scan: Learning to classify images without labels", arXiv:2005.12320v2, Jul. 3, 2020, p. 268-285.

Gao et al., "Dynamic view synthesis from dynamic monocular video", Proceedings of the IEEE/CVF International Conference on Computer Vision, May 13, 2021, p. 5712-5721.

Geirhos et al., "Imagenet-trained cnns are biased towards texture; increasing shape bias improves accuracy and robustness", arXiv:1811.12231v3, Nov. 29, 2018, 22 pp.

Girshick et al., "Rich feature hierarchies for accurate object detection and semantic segmentation", Proceedings of the IEEE conference on computer vision and pattern recognition, Oct. 22, 2014, p. 580-587.

Goodfellow et al., "Generative adversarial nets", Advances in neural information processing systems, vol. 27, Jun. 10, 2014, 9 pp.

Goodfellow et al., "Generative adversarial networks", Communications of the ACM, vol. 63, No. 11, Nov. 2020, p. 139-144.

Gulrajani et al., "Improved Training of Wasserstein GANs", Advances in neural information processing systems, vol. 30, Dec. 25, 2017, 11 pp.

Harkonen et al., "GANSpace: Discovering Interpretable GAN Controls", 34th Conference on Neural Information Processing Systems (NeurIPS 2020), vol. 33, Dec. 14, 2020, 10 pp.

He et al., "Deep residual learning for image recognition", Proceedings of the IEEE conference on computer vision and pattern recognition, IEEE, Dec. 10, 2015, p. 770-778.

He et al., "Mask R-CNN", Proceedings of the IEEE international conference on computer vision, Jan. 24, 2018, p. 2961-2969.

(56) References Cited

OTHER PUBLICATIONS

Hendrycks et al., "Benchmarking neural network robustness to common corruptions and perturbations", arXiv:1903.12261v1, Mar. 28, 2019, 16 pp.
Heusel et al., "Gans trained by a two time-scale update rule converge to a local nash equilibrium", 31st Conference on Neural Information Processing Systems (NIPS 2017), vol. 30, Jan. 12, 2018, 12 pp.
Ho et al., "Cascaded diffusion models for high fidelity image generation", Journal of Machine Learning Research, vol. 23, No. 47, Jan. 2022, 33 pp.
Honarvar et al., "Image reconstruction from a complete set of geometric and complex moments", Signal Processing, vol. 98, Elsevier B.V., Dec. 10, 2013, p. 224-232.
Howard et al., "Mobilenets: Efficient convolutional neural networks for mobile vision applications", arXiv:1704.04861v1, Apr. 17, 2017, 9 pp.
Hu et al., "Visual pattern recognition by moment invariants", IRE transactions on information theory, vol. 8, No. 2, Feb. 1962, p. 179-187.
Ioffe et al., "Batch normalization: Accelerating deep network training by reducing internal covariate shift", ArXiv:1502.03167v3, PMLR, Mar. 2, 2015, 11 pp.
Jaderberg et al., "Spatial transformer networks", Advances in neural information processing systems, vol. 28, Feb. 4, 2016, p. 2017-2025.
Jain et al., "Putting NeRF on a Diet: Semantically Consistent Few-Shot View Synthesis", Proceedings of the IEEE/CVF International Conference on Computer Vision, Apr. 1, 2021, p. 5885-5894.
Joseph-Rivlin et al., "Momen(e)t: Flavor the Moments in Learning to Classify Shapes", Proceedings of the IEEE/CVF International Conference on Computer Vision Workshops, IEEE, Oct. 3, 2019, 10 pp.
Karras et al., "A style-based generator architecture for generative adversarial networks", Proceedings of the IEEE/CVF conference on computer vision and pattern recognition, Mar. 29, 2019, p. 4401-4410.
Karras et al., "Alias-free generative adversarial networks", Advances in Neural Information Processing Systems, vol. 34, Dec. 6, 2021, p. 852-863.
Karras et al., "Analyzing and Improving the Image Quality of StyleGAN", Proceedings of the IEEE/CVF conference on computer vision and pattern recognition, Mar. 23, 2020, p. 8110-8119.
Khotanzad et al., "Invariant image recognition by zernike moments", IEEE Transactions on pattern analysis and machine intelligence, vol. 12, No. 5, IEEE, May 1990, p. 489-497.
Kim et al., "Invariant image watermark using zernike moments", IEEE transactions on Circuits and Systems for Video Technology, vol. 13, No. 8, IEEE, Aug. 2003, p. 766-775.
Kingma et al., "Auto-encoding variational bayes", arXiv:1312.6114v1, Dec. 20, 2013, 9 pp.
Kingma et al., "Stochastic gradient VB and the variational auto-encoder", Second International Conference on Learning Representations, vol. 19, ICLR, Apr. 2014, 29 pp.
Krizhevsky et al., "Imagenet classification with deep convolutional neural networks", Advances in neural information processing systems, vol. 25, 2012, p. 1097-1105, (Applicant points out, in accordance with MPEP 609.04(a), that the year of publication, 2012, is sufficiently earlier than the effective U.S. filing date, so that the particular month of publication is not an issue.).
Krizhevsky et al., "Learning multiple layers of features from tiny images", Citeseer, Apr. 8, 2009, 60 pp.
Kynkaanniemi et al., "Improved precision and recall metric for assessing generative models", Advances in Neural Information Processing Systems, vol. 32, Oct. 30, 2019, 10 pp.
Lee et al., "Vitgan: Training gans with vision transformers", arXiv:2107.04589v1, Jul. 9, 2021, 13 pp.
Li et al., "Ggm-net: Graph geometric moments convolution neural network for point cloud shape classification", IEEE Access, vol. 8, IEEE, Jul. 20, 2020, p. 124989-124998.
Luciano et al., "Deep learning with geodesic moments for 3d shape classification", Pattern Recognition Letters, vol. 105, Elsevier B.V., Apr. 1, 2018, p. 182-190.
Maddigan et al., "Chat2VIS: Generating Data Visualisations via Natural Language using ChatGPT, Codex, and GPT-3 Large Language Models", vol. 11, IEEE Access, May 12, 2023, p. 45181-45193.
Martin-Brualla et al., "Nerf in the wild: Neural radiance fields for unconstrained photo collections", Proceedings of the IEEE/CVF Conference on Computer Vision and Pattern Recognition, Jan. 6, 2021, p. 7210-7219.
Mescheder et al., "Occupancy networks: Learning 3d reconstruction in function space", Proceedings of the IEEE/CVF conference on computer vision and pattern recognition, Apr. 30, 2019, p. 4460-4470.
Mildenhall et al., "Nerf: Representing scenes as neural radiance fields for view synthesis", Communications of the ACM, vol. 65, No. 1, Dec. 17, 2021, pp. 99-106.
Miyato et al., "Spectral normalization for generative adversarial networks", arXiv:1802.05957v1, Feb. 16, 2018, 26 pp.
Nash et al., "Generating images with sparse representations", Proceedings of the 38 th International Conference on Machine Learning, PMLR, Mar. 5, 2021, p. 7958-7968.
Ntavelis et al., "Arbitrary-scale image synthesis", Proceedings of the IEEE/CVF Conference on Computer Vision and Pattern Recognition, Apr. 5, 2022, p. 11533-11542.
Park et al., "Nerfies: Deformable neural radiance fields", Proceedings of the IEEE/CVF International Conference on Computer Vision, Sep. 10, 2021, p. 5865-5874.
Peebles et al., "Scalable diffusion models with transformers", Mar. 2, 2023, 11 pp.
Pumarola et al., "D-NeRF: Neural Radiance Fields for Dynamic Scenes", Proceedings of the IEEE/CVF Conference on Computer Vision and Pattern Recognition, IEEE, Nov. 2, 2021, p. 10318-10327.
Radford et al., "Unsupervised representation learning with deep convolutional generative adversarial networks", arXiv preprint arXiv:1511.06434, Nov. 19, 2015, 15 pp.
Ramasinghe et al., "Beyond periodicity: Towards a unifying framework for activations in coordinate-mlps", Computer Vision—ECCV 2022: 17th European Conference, Springer, Oct. 23, 2022, p. 142-158.
Reed et al., "Dynamic ct reconstruction from limited views with implicit neural representations and parametric motion fields", Proceedings of the IEEE/CVF International Conference on Computer Vision, IEEE, Apr. 23, 2021, p. 2258-2268.
Reeves et al., "Three-dimensional shape analysis using moments and fourier descriptors", IEEE Transactions on Pattern Analysis and Machine Intelligence, vol. 10, No. 6, IEEE, Nov. 1988, p. 937-943.
Ren et al., "Faster R-CNN: Towards Real-Time Object Detection with Region Proposal Networks", Advances in neural information processing systems, vol. 28, Jun. 6, 2015, p. 91-99.
Roich et al., "Pivotal tuning for latent-based editing of real images", ACM Transactions on Graphics (TOG), vol. 42, No. 1, Aug. 12, 2022, 13 pp.
Ronneberger et al., "U-net: Convolutional networks for biomedical image segmentation", arXiv:1505.04597v1, May 18, 2015, p. 234-241.
Russakovsky et al., "Imagenet large scale visual recognition challenge", International journal of computer vision, vol. 115, No. 3, Springer, Dec. 2015, p. 211-252.
Sadjadi et al., "Three-dimensional moment invariants", IEEE Transactions on Pattern Analysis and Machine Intelligence, vol. 2, IEEE, Mar. 1980, pp. 127-136.
Salimans et al., "Improved Techniques for Training GANs", Advances in neural information processing systems, vol. 29, Jun. 10, 2016, 9 pp.
Sandler et al., "Mobilenetv2: Inverted residuals and linear bottlenecks", Proceedings of the IEEE conference on computer vision and pattern recognition, IEEE, Mar. 21, 2019, p. 4510-4520.
Sauer et al., "Projected GANs Converge Faster", Advances in Neural Information Processing Systems, vol. 34, Dec. 6, 2021, p. 17480-17492.

(56) References Cited

OTHER PUBLICATIONS

Sauer et al., "StyleGAN-XL: Scaling StyleGAN to Large Diverse Datasets", ACM SIGGRAPH 2022 Conference Proceedings, Aug. 7, 2022, 10 pp.
Selvaraju et al., "Gradcam: Visual explanations from deep networks via gradient-based localization", Proceedings of the IEEE international conference on computer vision, Dec. 3, 2019, p. 618-626.
Singh et al., "Improving Shape Awareness and Interpretability in Deep Networks Using Geometric Moments", Proceedings of the IEEE/CVF Conference on Computer Vision and Pattern Recognition, May 22, 2023, pp. 4159-4168.
Singh et al., "Non-parametric priors for generative adversarial networks", Proceedings of the 36th International Conference on Machine Learning, PMLR, May 24, 2019, p. 5838-5847.
Singh et al., "Polynomial Implicit Neural Representations for Large Diverse Datasets", Proceedings of the IEEE/CVF Conference on Computer Vision and Pattern Recognition, IEEE, Mar. 20, 2023, pp. 2041-2051.
Sitzmann et al., "Implicit neural representations with periodic activation functions", 34th Conference on Neural Information Processing Systems (NeurIPS 2020), vol. 33, Jun. 17, 2020, p. 7462-7473.
Sitzmann et al., "Light field networks: Neural scene representations with single-evaluation rendering", Advances in Neural Information Processing Systems, vol. 34, Dec. 6, 2021, p. 19313-19325.
Sitzmann et al., "Scene Representation Networks: Continuous 3D-Structure-Aware Neural Scene Representations", 33rd Conference on Neural Information Processing Systems (NeurIPS 2019), vol. 32, Jan. 28, 2020, 12 pp.
Skorokhodov et al., "Adversarial generation of continuous images", Proceedings of the IEEE/CVF Conference on Computer Vision and Pattern Recognition, Jun. 28, 2021, p. 10753-10764.
Skorokhodov et al., "Aligning latent and image spaces to connect the unconnectable", Proceedings of the IEEE/CVF International Conference on Computer Vision, Apr. 14, 2021, p. 14144-14153.
Szegedy et al., "Going deeper with convolutions", Proceedings of the IEEE conference on computer vision and pattern recognition, IEEE, Sep. 17, 2014, 9 pp.
Tan et al., "EfficientNet: Rethinking Model Scaling for Convolutional Neural Networks", arXiv:1905.11946v5, PMLR, Sep. 11, 2020, p. 6105-6114.
Tancik et al., "Fourier features let networks learn high frequency functions in low dimensional domains", 34th Conference on Neural Information Processing Systems (NeurIPS 2020), vol. 33, Jun. 18, 2020, p. 7537-7547.
Teague et al., "Image analysis via the general theory of moments", Journal of the Optical Society of America, vol. 70, No. 8, Optical Society of America, Nov. 1, 1979, pp. 920-930.
Theodoridis et al., "Zernike pooling: Generalizing average pooling using zernike moments", vol. 9, IEEE Access, Sep. 8, 2021, p. 121128-121136.
Touvron et al., "Training data-efficient image transformers & distillation through attention", Proceedings of the 38 th International Conference on Machine Learning, PMLR, Jul. 1, 2021, p. 10347-10357.
Tov et al., "Designing an encoder for stylegan image manipulation", ACM Transactions on Graphics (TOG), vol. 40, No. 4, Association for Computing Machinery, Aug. 2021, 14 pp.
Tuceryan et al., "Moment-based texture segmentation", Pattern recognition letters, vol. 15, No. 7, Jul. 1, 1994, p. 659-668.
U.S. Appl. No. 18/672,711, filed May 23, 2024, naming inventors Singh et al.
Wang et al., "Using zernike moments for the illumination and geometry invariant classification of multispectral texture", IEEE Transactions on Image Processing, vol. 7, No. 2, IEEE, Feb. 1998, pp. 196-203.
Wu et al., "Momentsnet: a simple learningfree method for binary image recognition", 2017 IEEE International Conference on Image Processing (ICIP), IEEE, Sep. 17, 2017, p. 2667-2671.
Xian et al., "Space-time neural irradiance fields for free-viewpoint video", Proceedings of the IEEE/CVF Conference on Computer Vision and Pattern Recognition, Jun. 18, 2021, p. 9421-9431.
Xu et al., "Towards learning affine-invariant representations via data-efficient cnns", Proceedings of the IEEE/CVF Winter Conference on Applications of Computer Vision, Aug. 31, 2019, p. 904-913.
Yap et al., "An efficient method for the computation of legendre moments", IEEE Transactions on Pattern Analysis and Machine Intelligence, vol. 27, No. 12, IEEE, Dec. 2005, p. 1996-2002.
Yariv et al., "Multiview neural surface reconstruction by disentangling geometry and appearance", 34th Conference on Neural Information Processing Systems (NeurIPS 2020), vol. 33, Oct. 25, 2020, pp. 2492-2502.
Yoon et al., "Spheresr: 360deg image super-resolution with arbitrary projection via continuous spherical image representation", Proceedings of the IEEE/CVF Conference on Computer Vision and Pattern Recognition, Dec. 14, 2021, p. 5677-5686.
Yu et al., "pixelNeRF: Neural Radiance Fields from One or Few Images", Proceedings of the IEEE/CVF Conference on Computer Vision and Pattern Recognition, May 30, 2021, p. 4578-4587.
Zhang et al., "Affine legendre moment invariants for image watermarking robust to geometric distortions", IEEE Transactions on Image Processing, vol. 20, No. 8, IEEE, Aug. 2011, p. 2189-2199.
Zhang et al., "Blurred image recognition by legendre moment invariants", IEEE Transactions on Image Processing, vol. 19, No. 3, IEEE, Mar. 2010, p. 596-611.
Zhao et al., "Improved transformer for high-resolution gans", 35th Conference on Neural Information Processing Systems (NeurIPS 2021), vol. 34, Dec. 6, 2021, p. 18367-18380.
Zhu et al., "A natural language interface to a graph-based bibliographic information retrieval system", Data & Knowledge Engineering, vol. 111, Elsevier, Sep. 1, 2017, 33 pp.
Barron et al., "Mip-NeRF: A Multiscale Representation for Anti-Aliasing Neural Radiance Fields", Proceedings of the IEEE/CVF international conference on computer vision, 2021, pp. 5855-5864, (Applicant points out, in accordance with MPEP 609.04(a), that the year of publication, 2021, is sufficiently earlier than the effective U.S. filing date, so that the particular month of publication is not an issue.).
Borgefors, "Hierarchical Chamfer Matching: A Parametric Edge Matching", IEEE Transactions on pattern analysis and machine intelligence, vol. 10, No. 6, IEEE, Nov. 1988, pp. 849-865.
Chen et al., "Control-A-Video: Controllable Text-to-Video Diffusion Models with Motion Prior and Reward Feedback Learning", arXiv:2305.13840v3, Aug. 12, 2024, 20 pp.
Chen et al., "Control3D: Towards Controllable Text-to-3D Generation", Proceedings of the 31st ACM International Conference on Multimedia, ACM, Oct. 29, 2023, pp. 1148-1156.
Chen et al., "Fantasia3D: Disentangling Geometry and Appearance for High-quality Text-to-3D Content Creation", Proceedings of the IEEE/CVF international conference on computer vision, 2023, pp. 22246-22256, (Applicant points out, in accordance with MPEP 609.04(a), that the year of publication, 2023, is sufficiently earlier than the effective U.S. filing date, so that the particular month of publication is not an issue.).
Chen et al., "Text-to-3D using Gaussian Splatting", Proceedings of the IEEE/CVF conference on computer vision and pattern recognition, 2024, pp. 21401-21412, (Applicant points out, in accordance with MPEP 609.04(a), that the year of publication, 2024, is sufficiently earlier than the effective U.S. filing date, so that the particular month of publication is not an issue.).
Cheng et al., "SDFusion: Multimodal 3D Shape Completion, Reconstruction, and Generation", Proceedings of the IEEE/CVF conference on computer vision and pattern recognition, 2023, pp. 4456-4465, (Applicant points out, in accordance with MPEP 609.04(a), that the year of publication, 2023, is sufficiently earlier than the effective U.S. filing date, so that the particular month of publication is not an issue.).
Deitke et al., "Objaverse: A Universe of Annotated 3D Objects", Proceedings of the IEEE/CVF conference on computer vision and pattern recognition, 2023, pp. 13142-13153, (Applicant points out, in accordance with MPEP 609.04(a), that the year of publication,

(56) References Cited

OTHER PUBLICATIONS 2023, is sufficiently earlier than the effective U.S. filing date, so that the particular month of publication is not an issue.).
Hu et al., "LoRA: Low-Rank Adaptation of Large Language Models", arXiv:2106.09685v1, Jun. 17, 2021, 20 pp.
Huang et al., "DreamControl: Control-Based Text-to-3D Generation with 3D Self-Prior", Proceedings of the IEEE/CVF conference on computer vision and pattern recognition, 2024, pp. 5364-5373, (Applicant points out, in accordance with MPEP 609.04(a), that the year of publication, 2024, is sufficiently earlier than the effective U.S. filing date, so that the particular month of publication is not an issue.).
Jun et al., "Shap•E: Generating Conditional 3D Implicit Functions", arXiv:2305.02463v1, May 3, 2023, 23 pp.
Kerbl et al., "3D Gaussian Splatting for Real-Time Radiance Field Rendering", Nov. 20, 2023, 25 pp.
Li et al., "Sweetdreamer: Aligning geometric priors in 2d diffusion for consistent text-to-3d", International conference on learning representations, 2024, 23 pp., (Applicant points out, in accordance with MPEP 609.04(a), that the year of publication, 2024, is sufficiently earlier than the effective U.S. filing date, so that the particular month of publication is not an issue.).
Lin et al., "Magic3D: High-Resolution Text-to-3D Content Creation", Proceedings of the IEEE/CVF conference on computer vision and pattern recognition, 2023, pp. 300-309, (Applicant points out, in accordance with MPEP 609.04 (a), that the year of publication, 2023, is sufficiently earlier than the effective U.S. filing date, so that the particular month of publication is not an issue. ).
Liu et al., "Syncdreamer: Generating multiview-consistent images from a single-view image", International conference on learning representations, May 31, 2024, 22 pp.
Liu et al., "Zero-1-to-3: Zero-shot One Image to 3D Object", Proceedings of the IEEE/CVF international conference on computer vision, 2023, pp. 9298-9309, (Applicant points out, in accordance with MPEP 609.04(a), that the year of publication, 2023, is sufficiently earlier than the effective U.S. filing date, so that the particular month of publication is not an issue.).
Long et al., "Wonder3D: Single Image to 3D using Cross-Domain Diffusion", Proceedings of the IEEE/CVF conference on computer vision and pattern recognition, 2023, pp. 9970-9980, (Applicant points out, in accordance with MPEP 609.04(a), that the year of publication, 2023, is sufficiently earlier than the effective U.S. filing date, so that the particular month of publication is not an issue.).
Luo et al., "Scalable 3D Captioning with Pretrained Models", 37th Conference on Neural Information Processing Systems, Dec. 15, 2023, 31 pp., (Applicant points out, in accordance with MPEP 609.04(a), that the year of publication, 2023, is sufficiently earlier than the effective U.S. filing date, so that the particular month of publication is not an issue.).
Metzer et al., "Latent-NeRF for Shape-Guided Generation of 3D Shapes and Textures", Proceedings of the IEEE/CVF conference on computer vision and pattern recognition, 2023, pp. 12663-12673, (Applicant points out, in accordance with MPEP 609.04(a), that the year of publication, 2023, is sufficiently earlier than the effective U.S. filing date, so that the particular month of publication is not an issue.).
Müller et al., "Instant Neural Graphics Primitives with a Multiresolution Hash Encoding", ACM transactions on graphics, vol. 41, No. 4, Jul. 22, 2022, 15 pp.
Nichol et al., "GLIDE: Towards Photorealistic Image Generation and Editing with Text-Guided Diffusion Models", arXiv:2112.10741v3, Mar. 8, 2022, 20 pp.
Nichol et al., "Point•E: A System for Generating 3D Point Clouds from Complex Prompts", arXiv:2212.08751v1, Dec. 16, 2022, 14 pp.
Notice of Allowance from U.S. Appl. No. 18/672,711 dated Mar. 25, 2026, 10 pp.
Poole et al., "Dreamfusion: Text-to-3d using 2d diffusion", arXiv:2209.14988v1, Sep. 29, 2022, 18 pp.
Reimers et al., "Sentence-BERT: Sentence Embeddings using Siamese BERT-Networks", Proceedings of the 2019 Conference on Empirical Methods in Natural Language Processing and the 9th International Joint Conference on Natural Language Processing, Association for Computational Linguistics, Nov. 3, 2019, pp. 3982-3992.
Rombach et al., "High-Resolution Image Synthesis with Latent Diffusion Models", Proceedings of the IEEE/CVF conference on computer vision and pattern recognition, 2022, pp. 10684-10695, (Applicant points out, in accordance with MPEP 609.04(a), that the year of publication, 2022, is sufficiently earlier than the effective U.S. filing date, so that the particular month of publication is not an issue.).
Ruiz et al., "Dreambooth: Fine tuning text-to-image diffusion models for subject-driven generation", Proceedings of the IEEE/CVF conference on computer vision and pattern recognition, 2023, pp. 22500-22510, (Applicant points out, in accordance with MPEP 609.04(a), that the year of publication, 2023, is sufficiently earlier than the effective U.S. filing date, so that the particular month of publication is not an issue.).
Saharia et al., "Photorealistic Text-to-Image Diffusion Models with Deep Language Understanding", 36th Conference on Neural Information Processing Systems, Dec. 6, 2022, 16 pp.
Seo et al., "Let 2d diffusion model know 3d-consistency for robust text-to-3d generation", arXiv:2303.07937v4, Feb. 6, 2024, 20 pp.
Shao et al., "Control4D: Efficient 4D Portrait Editing with Text", Proceedings of the IEEE/CVF Conference on Computer Vision and Pattern Recognition, 2024, pp. 4556-4567, (Applicant points out, in accordance with MPEP 609.04(a), that the year of publication, 2024, is sufficiently earlier than the effective U.S. filing date, so that the particular month of publication is not an issue.).
Shi et al., "Mvdream: Multi-view diffusion for 3d generation", International conference on learning representations, May 31, 2024, 22 pp.
Tang et al., "Make-It-3D: High-Fidelity 3D Creation from A Single Image with Diffusion Prior", Proceedings of the IEEE/CVF international conference on computer vision, 2023, pp. 22819-22829, (Applicant points out, in accordance with MPEP 609.04(a), that the year of publication, 2023, is sufficiently earlier than the effective U.S. filing date, so that the particular month of publication is not an issue.).
Wang et al., "ProlificDreamer: High-Fidelity and Diverse Text-to-3D Generation with Variational Score Distillation", 37th Conference on Neural Information Processing Systems, vol. 36, Dec. 15, 2023, 36 pp.
Wei et al., "ELITE: Encoding Visual Concepts into Textual Embeddings for Customized Text-to-Image Generation", Proceedings of the IEEE/CVF international conference on computer vision, 2023, pp. 15943-15953, (Applicant points out, in accordance with MPEP 609.04(a), that the year of publication, 2023, is sufficiently earlier than the effective U.S. filing date, so that the particular month of publication is not an issue.).
Wei et al., "TAPS3D: Text-Guided 3D Textured Shape Generation from Pseudo Supervision", Proceedings of the IEEE/CVF conference on computer vision and pattern recognition, 2023, pp. 16805-16815, (Applicant points out, in accordance with MPEP 609.04(a), that the year of publication, 2023, is sufficiently earlier than the effective U.S. filing date, so that the particular month of publication is not an issue.).
Yuanchen et al., "threestudio: A unified framework for 3d content generation", Github, Dec. 16, 2024, 21 pp., URL: https://github.com/threestudio-project/threestudio.
Zhang et al., "Adding Conditional Control to Text-to-Image Diffusion Models", Proceedings of the IEEE/CVF international conference on computer vision, 2023, pp. 3836-3847, (Applicant points out, in accordance with MPEP 609.04(a), that the year of publication, 2023, is sufficiently earlier than the effective U.S. filing date, so that the particular month of publication is not an issue.).
Zhang et al., "Controlvideo: Training-free controllable text-to-video generation", International Conference on Learning Representations, May 31, 2024, 21 pp.
Notice of Allowance from U.S. Appl. No. 18/672,711 dated Aug. 14, 2026, 9 pp.

(56) References Cited

OTHER PUBLICATIONS

Response to Office Action dated May 28, 2026 from U.S. Appl. No. 18/672,711, filed Jul. 28, 2026, 13 pp.
Office Action from U.S. Appl. No. 18/672,711 dated May 28, 2026, 6 pp.

* cited by examiner

301A – TABLE 1A (ImageNet 128 x 128):

| METHOD | FID ↓ | sFID ↓ | rFID ↓ | IS ↑ | Pr ↑ | REC. ↑ |
|---|---|---|---|---|---|---|
| BigGAN | 6.02 | 7.18 | 6.09 | 145.83 | 0.86 | 0.35 |
| CDM | 3.52 | - | - | 128.80 | - | - |
| ADM | 5.91 | 5.09 | 13.29 | 93.31 | 0.70 | 0.65 |
| ADM-G | 2.97 | 5.09 | 3.80 | 141.37 | 0.78 | 0.59 |
| StyleGAN-XL | 1.81 | 3.82 | 1.82 | 200.55 | 0.77 | 0.55 |
| Poly-INR | **2.08** | **3.93** | **2.76** | **179.64** | **0.70** | **0.45** |

FIG. 3A

301B – TABLE 1B (ImageNet 256 x 256 ):

| METHOD | FID ↓ | sFID ↓ | rFID ↓ | IS ↑ | Pr ↑ | REC. ↑ |
|---|---|---|---|---|---|---|
| BigGAN | 6.95 | 7.36 | 75.24 | 202.65 | 0.87 | 0.28 |
| ADM | 10.94 | 6.02 | 125.78 | 100.98 | 0.69 | 0.63 |
| ADM-G | 3.94 | 6.14 | 11.86 | 215.84 | 0.83 | 0.53 |
| DiT-XL/2-G | 2.27 | 4.60 | – | 278.54 | 0.83 | 0.57 |
| StyleGAN-XL | 2.30 | 4.02 | 7.06 | 265.12 | 0.78 | 0.53 |
| **Poly-INR** | **2.86** | **4.37** | **7.79** | **241.43** | **0.71** | **0.39** |

FIG. 3B

301C – TABLE 1C (ImageNet 512 x 512):

| METHOD | FID ↓ | sFID ↓ | rFID ↓ | IS ↑ | Pr ↑ | REC. ↑ |
|---|---|---|---|---|---|---|
| BigGAN | 8.43 | 8.13 | 312.00 | 177.90 | 0.88 | 0.29 |
| ADM | 23.24 | 10.19 | 561.32 | 58.06 | 0.73 | 0.60 |
| ADM-G | 3.85 | 5.86 | 210.83 | 221.72 | 0.84 | 0.53 |
| DiT-XL/2-G | 3.04 | 5.04 | – | 240.82 | 0.84 | 0.54 |
| StyleGAN-XL | 2.41 | 4.06 | 51.54 | 267.75 | 0.77 | 0.52 |
| **Poly-INR** | **3.81** | **5.06** | **54.31** | **267.44** | **0.70** | **0.34** |

FIG. 3C

301D – TABLE 1D
Number of parameters in millions (M)

| METHOD | $64^2$ | $128^2$ | $256^2$ | $512^2$ |
|---|---|---|---|---|
| BigGAN | – | 141.0 | 164.3 | 164.7 |
| ADM | 296.0 | 422.0 | 554.0 | 559.0 |
| DiT-XL/2-G | – | – | 675.0 | 675.0 |
| StyleGAN-XL | 134.4 | 158.7 | 166.3 | 168.4 |
| Poly-INR | **46.0** | **46.0** | **46.0** | **46.0** |

FIG. 3D

401 – TABLE 2

| METHOD | Params (M) | FID ↓ | Inference Time (sec/img) |
|---|---|---|---|
| BigGAN | 30.0 | 3.83 | 0.016 |
| ADM | 67.9 | 2.19 | 0.047 |
| DiT-XL/2-G | 45.9 | 4.38 | 0.067 |
| StyleGAN-XL | 72.4 | 4.95 | 0.024 |
| **Poly-INR** | **13.6** | **2.72** | **0.054** |

FIG. 4

SAMPLE IMAGES 505
(GENERATED BY POLY-INR FRAMEWORK)

801 – TABLE 3

| TRAINING RESOLUTION | NEAREST NEIGHBOR | BILINEAR | BICUBIC | Poly-INR |
|---|---|---|---|---|
| 32 X 32 | 184.39 | 112.28 | 73.86 | 65.15 |
| **64 X 64** | **89.24** | **72.41** | **42.97** | **36.30** |

FIG. 8

GENERATING POLYNOMIAL IMPLICIT NEURAL REPRESENTATIONS FOR LARGE DIVERSE DATASETS

CLAIM OF PRIORITY

This application claims the benefit of U.S. Patent Application No. 63/506,554, filed Jun. 6, 2023, the entire contents of which is incorporated herein by reference.

GOVERNMENT RIGHTS AND GOVERNMENT AGENCY SUPPORT NOTICE

This invention was made with government support under HR0011-22-9-0073 awarded by the Defense Advanced Research Projects Agency (DARPA). The government has certain rights in the invention.

TECHNICAL FIELD

This disclosure generally relates to the field of artificial intelligence and machine learning via computational systems and more particularly, to systems, methods, and apparatuses for generating polynomial implicit neural representations for large diverse datasets.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of image processing.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and subsequent model regularization. Convolutional Neural Networks also seek to apply model regularization, but with a distinct approach. Specifically, CNNs take advantage of the hierarchical pattern in data and assemble more complex patterns using smaller and simpler patterns. Consequently, on the scale of connectedness and complexity, CNNs are on the lower extreme.

SUMMARY

In general, this disclosure is directed to improved techniques for generating polynomial implicit neural representations for large diverse datasets.

Abstract Implicit neural representations (INR) have gained significant popularity for signal and image representation for many end-tasks, such as super-resolution, 3D modeling, and more. Most INR architectures rely on sinusoidal positional encoding, which accounts for high-frequency information in data. However, the finite encoding size restricts the model's representational power. Higher representational power may enable transitioning from representing a single given image to representing large and diverse datasets.

Unfortunately, prior known techniques fail to adequately represent large and diverse datasets through the use of presently available machine learning techniques, and much less generate sufficiently high-fidelity image output from a trained AI model without excessive complexity.

This disclosure describes improved techniques for using machine learning methodologies to train an AI model to generate high-quality polynomial implicit neural representations without use of convolution, normalization, or self-attention layers, and also without the traditional millions upon millions of trainable parameters which are required by prior known techniques.

The Poly-INR framework described herein addresses this gap by representing an image with a polynomial function without use of positional encodings. To achieve a progressively higher degree of polynomial representation, the Poly-INR framework described herein may utilize element-wise multiplications between features and affine-transformed coordinate locations after every ReLU layer. The described methodology was evaluated both qualitatively and quantitatively on large datasets like ImageNet and shown to perform comparably to state-of-the-art generative models without any convolution layers, normalization layers, or self-attention layers, and with far fewer trainable parameters than prior known techniques.

The present state of the art may therefore benefit from the systems, methods, and apparatuses for generating polynomial implicit neural representations for large diverse datasets, as is described herein.

In at least one example, one or more processors of a computing device are configured to perform a computer-implemented method. Such a method may include processing circuitry executing a Polynomial Implicit Neural Representation generator framework (Poly-INR framework) having at least a mapping network and a synthesis network. In such examples, processing circuitry may obtain, using the Poly-INR framework, a training dataset having a plurality of input images and map, using the mapping network, latent code extracted from the plurality of input images of the training dataset into an affine parameters space. In such an example, processing circuitry may generate, using the mapping network, affine transformation parameters from the affine parameters space. Processing circuitry may obtain, using the synthesis network, the affine transformation parameters and pixel coordinate locations and parameterize the affine transformation parameters using the latent code extracted from the plurality of input images of the training dataset as a known distribution. According to such examples, processing circuitry may train, using the Poly-INR framework, an AI model to learn a polynomial order representing the training dataset from the affine transformation parameters parameterized and output the AI model.

In at least one example, a system includes processing circuitry; non-transitory computer readable media; and instructions that, when executed by the processing circuitry, configure the processing circuitry to perform operations. In such an example, processing circuitry may configure the system to execute a Polynomial Implicit Neural Representation generator framework (Poly-INR framework) having at least a mapping network and a synthesis network. In such examples, processing circuitry may obtain, using the Poly-INR framework, a training dataset having a plurality of input images and map, using the mapping network, latent code extracted from the plurality of input images of the training dataset into an affine parameters space. In such an example, processing circuitry may generate, using the mapping network, affine transformation parameters from the affine parameters space. Processing circuitry may obtain, using the synthesis network, the affine transformation parameters and pixel coordinate locations and parameterize the affine transformation parameters using the latent code extracted from the plurality of input images of the training dataset as a known distribution. According to such examples, processing circuitry may train, using the Poly-INR framework, an AI model to learn a polynomial order representing the training dataset from the affine transformation parameters parameterized and output the AI model.

In one example, there is computer-readable storage media having instructions that, when executed, configure processing circuitry to perform operations. Such operations may include executing a Polynomial Implicit Neural Representation generator framework (Poly-INR framework) having at least a mapping network and a synthesis network. In such examples, operations may obtain, using the Poly-INR framework, a training dataset having a plurality of input images and map, using the mapping network, latent code extracted from the plurality of input images of the training dataset into an affine parameters space. In such an example, processing circuitry may generate, using the mapping network, affine transformation parameters from the affine parameters space. Processing circuitry may obtain, using the synthesis network, the affine transformation parameters and pixel coordinate locations and parameterize the affine transformation parameters using the latent code extracted from the plurality of input images of the training dataset as a known distribution. According to such examples, processing circuitry may train, using the Poly-INR framework, an AI model to learn a polynomial order representing the training dataset from the affine transformation parameters parameterized and output the AI model.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIGS. 3A, 3B, 3C, and 3D depict Tables 1A, 1B, 1C, and 1D illustrating a quantitative comparison of Poly-INR method with CNN-based generative models on ImageNet datasets, in accordance with aspects of the disclosure.

FIG. 4 depicts Table 2 illustrating a quantitative comparison of Poly-INR framework with CNN and INR-based generative models, in accordance with aspects of the disclosure.

FIG. 8 depicts Table 3 providing an FID score for models trained at a lower resolution and compared against classical interpolation-based up-sampling, in accordance with aspects of the disclosure.

Like reference characters denote like elements throughout the text and figures.

DETAILED DESCRIPTION

Aspects of the disclosure provide improved techniques for generating polynomial implicit neural representations for large diverse datasets.

Abstract Implicit neural representations (INR) have gained significant popularity for signal and image representation for many end-tasks, such as super-resolution, 3D modeling, and more. Most INR architectures rely on sinusoidal positional encoding, which accounts for high-frequency information in data. However, the finite encoding size restricts the model's representational power. Higher representational power may enable transitioning from representing a single given image to representing large and diverse datasets.

The Poly-INR framework described herein addresses this gap by representing an image with a polynomial function without use of positional encodings. To achieve a progressively higher degree of polynomial representation, the Poly-INR framework described herein may utilize element-wise multiplications between features and affine-transformed coordinate locations after every ReLU layer. The described methodology was evaluated both qualitatively and quantitatively on large datasets like ImageNet and shown to perform comparably to state-of-the-art generative models without any convolution layers, normalization layers, or self-attention layers, and with far fewer trainable parameters than prior known techniques.

With fewer training parameters and higher representative power, the described Poly-INR framework paves the way for broader adoption of INR models for generative modeling tasks in complex domains.

Figure 1:
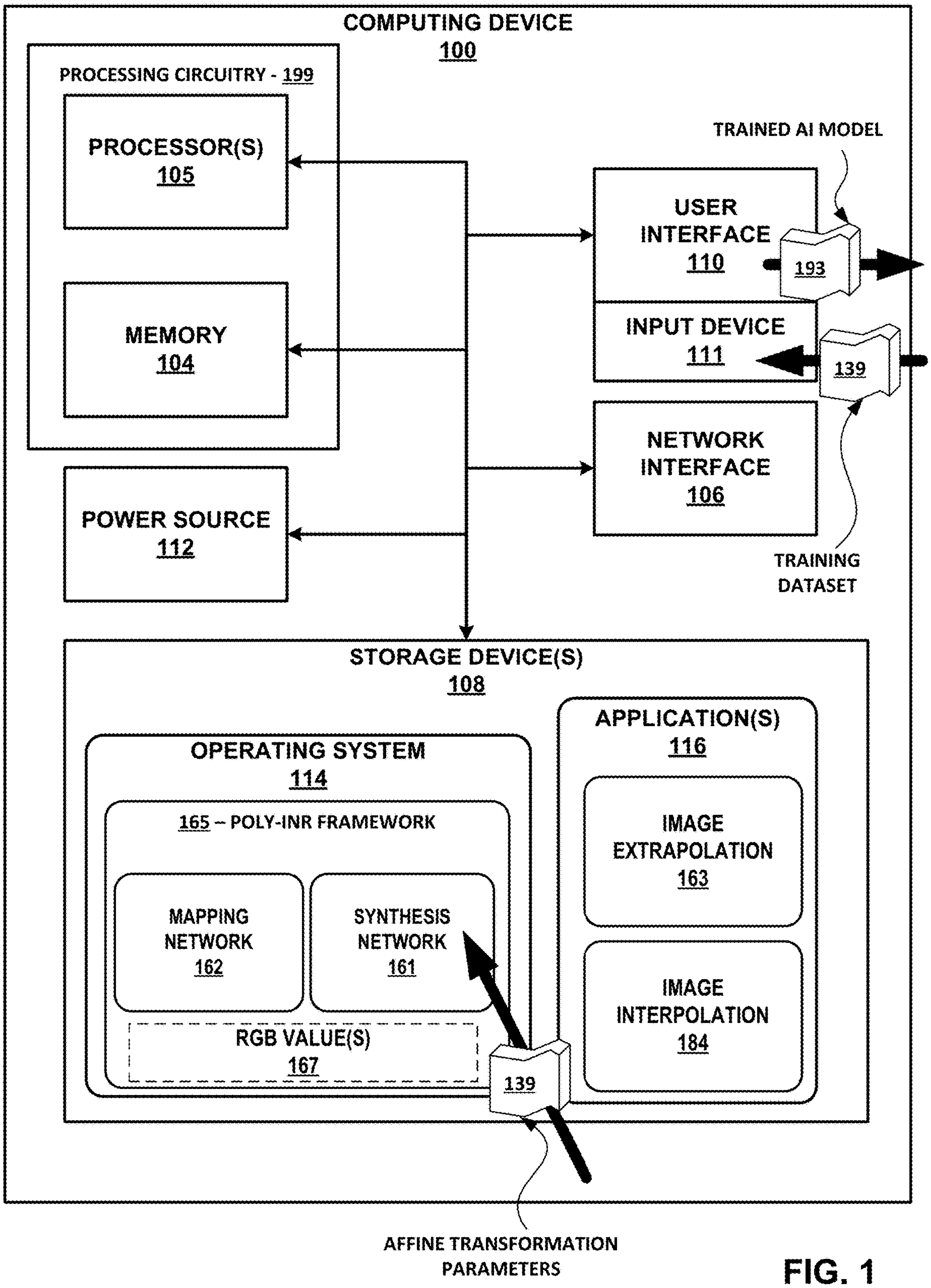
FIG. 1 is a block diagram illustrating further details of one example of computing device, in accordance with aspects of this disclosure.

FIG. 1 is a block diagram illustrating further details of one example of computing device, in accordance with aspects of this disclosure. FIG. 1 illustrates only one particular example of computing device 100. Many other example embodiments of computing device 100 may be used in other instances.

As shown in the specific example of FIG. 1, computing device 100 may include processing circuitry 199 including one or more processors 105 and memory 104. Computing device 100 may further include network interface 106, one or more storage devices 108, user interface 110, and power source 112. Computing device 100 may also include an operating system 114. Computing device 100, in one example, may further include one or more applications 116, such as image extrapolation 163 and image interpolation 184. One or more other applications 116 may also be executable by computing device 100. Components of computing device 100 may be interconnected (physically, communicatively, and/or operatively) for inter-component communications.

Operating system 114 may execute various functions including executing trained AI model 193 and performing AI model training. As shown here, operating system 114 executes a Polynomial Implicit Neural Representation (Poly-INR) generator framework (Poly-INR framework) 165 which includes both mapping network 161 and synthesis network 162 components. Synthesis network 162 may receive as input, affine transformation parameters 139 as well as pixel location coordinates derived from images within the training dataset. Poly-INR framework 165 further includes RGB value(s) 167 which are generated as output from an affine-transformed coordinate grid corresponding to pixel locations within a coordinate grid prior to affine transformation.

Computing device 100 may perform techniques for generating polynomial implicit neural representations for large diverse datasets, including performing AI model training using a training dataset including, for example, learning the polynomial order to represent complex datasets with considerably fewer trainable parameters than all prior known techniques. Poly-INR framework 165 may train and generate as output, trained AI model 193. Computing device 100 may provide trained AI model 193 as output to a connected user device via user interface 110.

In some examples, processing circuitry including one or more processors 105, implements functionality and/or process instructions for execution within computing device 100. For example, one or more processors 105 may be capable of processing instructions stored in memory 104 and/or instructions stored on one or more storage devices 108.

Memory 104, in one example, may store information within computing device 100 during operation. Memory 104, in some examples, may represent a computer-readable storage medium. In some examples, memory 104 may be a temporary memory, meaning that a primary purpose of memory 104 may not be long-term storage. Memory 104, in some examples, may be described as a volatile memory, meaning that memory 104 may not maintain stored contents when computing device 100 is turned off. Examples of volatile memories may include random access memories (RAM), dynamic random-access memories (DRAM), static random-access memories (SRAM), and other forms of volatile memories. In some examples, memory 104 may be used to store program instructions for execution by one or more processors 105. Memory 104, in one example, may be used by software or applications running on computing device 100 (e.g., one or more applications 116) to temporarily store data and/or instructions during program execution.

One or more storage devices 108, in some examples, may also include one or more computer-readable storage media. One or more storage devices 108 may be configured to store larger amounts of information than memory 104. One or more storage devices 108 may further be configured for long-term storage of information. In some examples, one or more storage devices 108 may include non-volatile storage elements. Examples of such non-volatile storage elements may include magnetic hard disks, optical discs, floppy disks, Flash memories, or forms of electrically programmable memories (EPROM) or electrically erasable and programmable (EEPROM) memories.

Computing device 100, in some examples, may also include a network interface 106. Computing device 100, in such examples, may use network interface 106 to communicate with external devices via one or more networks, such as one or more wired or wireless networks. Network interface 106 may be a network interface card, such as an Ethernet card, an optical transceiver, a radio frequency transceiver, a cellular transceiver or cellular radio, or any other type of device that may send and receive information. Other examples of such network interfaces may include BLUETOOTH®, 3G, 4G, 1G, LTE, and WI-FI® radios in mobile computing devices as well as USB. In some examples, computing device 100 may use network interface 106 to wirelessly communicate with an external device such as a server, mobile phone, or other networked computing device.

User interface 110 may include one or more input devices 111, such as a touch-sensitive display. Input device 111, in some examples, may be configured to receive input from a user through tactile, electromagnetic, audio, and/or video feedback. Examples of input device 111 may include a touch-sensitive display, mouse, keyboard, voice responsive system, video camera, microphone or any other type of device for detecting gestures by a user. In some examples, a touch-sensitive display may include a presence-sensitive screen.

User interface 110 may also include one or more output devices, such as a display screen of a computing device or a touch-sensitive display, including a touch-sensitive display of a mobile computing device. One or more output devices, in some examples, may be configured to provide output to a user using tactile, audio, or video stimuli. One or more output devices, in one example, may include a display, sound card, a video graphics adapter card, or any other type of device for converting a signal into an appropriate form understandable to humans or machines. Additional examples of one or more output devices may include a speaker, a cathode ray tube (CRT) monitor, a liquid crystal display (LCD), or any other type of device that may generate intelligible output to a user.

Computing device 100, in some examples, may include power source 112, which may be rechargeable and provide power to computing device 100. Power source 112, in some examples, may be a battery made from nickel-cadmium, lithium-ion, or other suitable material.

Examples of computing device 100 may include operating system 114. Operating system 114 may be stored in one or more storage devices 108 and may control the operation of components of computing device 100. For example, operating system 114 may facilitate the interaction of one or more applications 116 with hardware components of computing device 100.

Figure 2A:
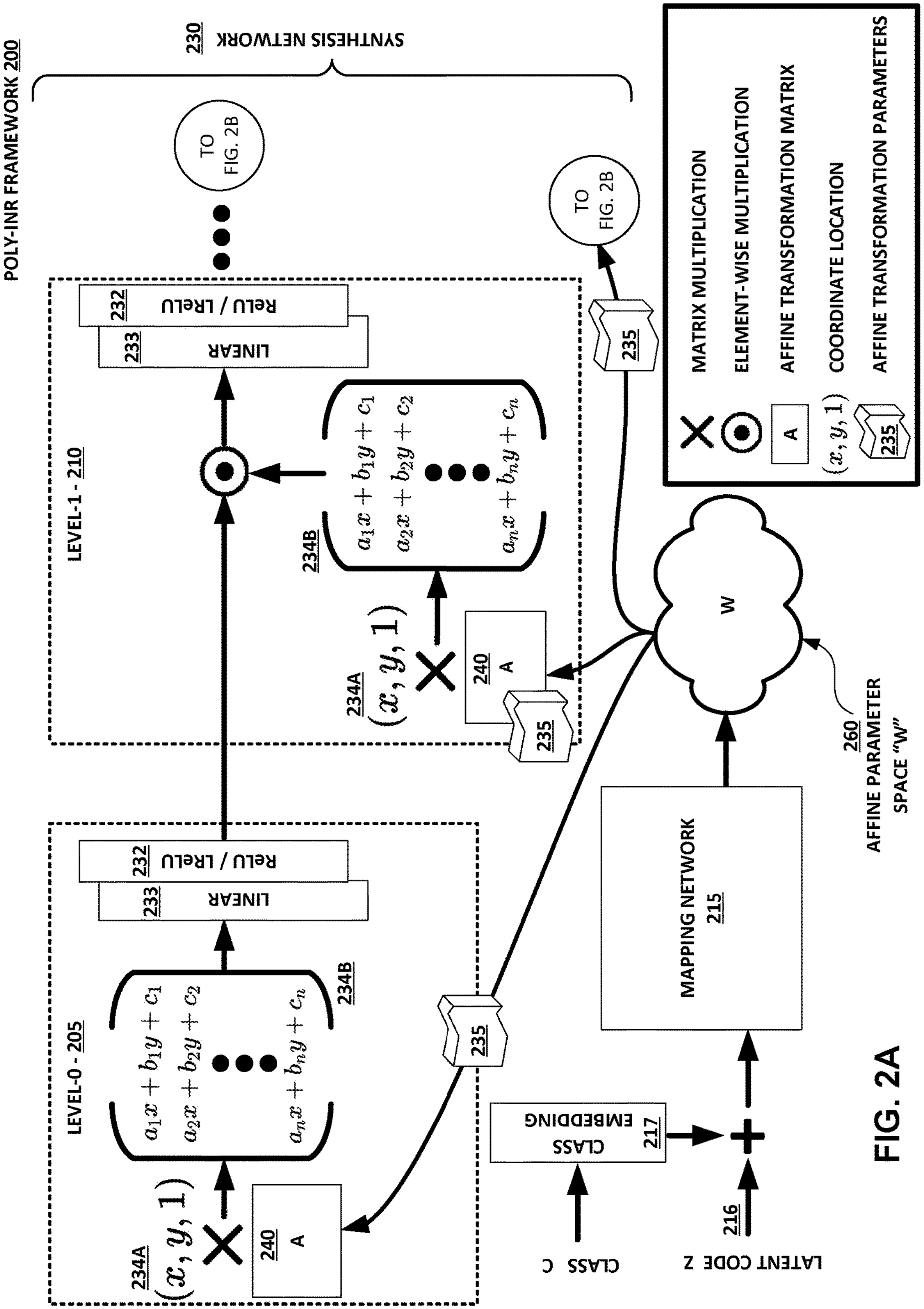
FIGS. 2A and 2B depict an overview of Polynomial Implicit Neural Representation (Poly-INR) generator framework (Poly-INR framework), in accordance with aspects of the disclosure.
Figure 2B:
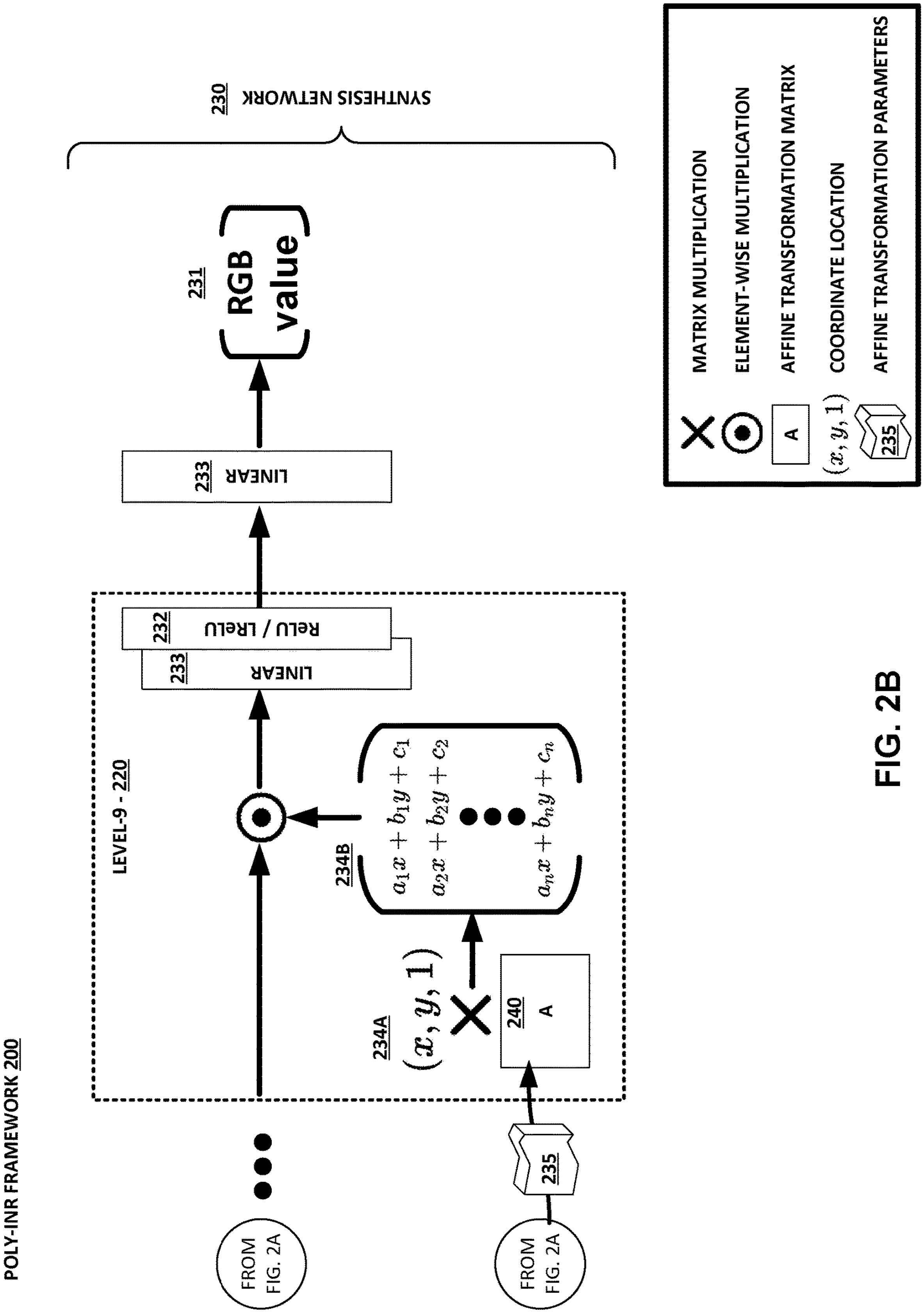

FIGS. 2A and 2B depict an overview of Polynomial Implicit Neural Representation (Poly-INR) generator framework 200 (Poly-INR framework 200 hereinafter), in accordance with aspects of the disclosure. In the example shown here, Poly-INR framework 200 includes two networks. With reference to FIG. 2A, Poly-INR framework 200 includes mapping network 215, which generates the affine parameters from latent code 216 represented by the term "z". With reference to FIG. 2B, Poly-INR framework 200 further includes synthesis network 230, which synthesizes RGB value 231 for the given pixel location. According to certain examples, Poly-INR framework 200 uses only Linear 233 layers and ReLU/LReLU layer(s) 232 end-to-end. In the context of machine learning (ML), a Rectified Linear Unit (ReLU) which is also referred to as a rectifier activation function, provides the property of nonlinearity to a deep learning model to solve the issue of vanishing gradients by interpreting the positive part of its argument. Similar to ReLU, a Leaky Rectified Linear Unit (LReLU) is a type of activation function used in deep learning models, particularly in convolutional neural networks (CNNs) that allows for a small, non-zero gradient when the input is negative.

Deep learning-based generative models are a very active area of research with numerous advancements in recent years. Most widely, generative models are based on convolutional architectures. However, recent developments such as implicit neural representations (INR) represent an image as a continuous function of its coordinate locations, where each pixel is synthesized independently. Such a function is approximated by using a deep neural network.

Use of INR techniques provide flexibility for easy image transformations and high-resolution up-sampling through the use of a coordinate grid. Thus, INRs have become very effective for 3D scene reconstruction and rendering from very few training images. However, INRs are usually trained to represent a single given scene, signal, or image. Recently, INRs have been implemented as a generative model to generate entire image datasets. INRs perform comparably to CNN-based generative models on perfectly curated datasets like human faces; however, INRs have yet to be scaled to large, diverse datasets like ImageNet. INRs type models generally include a positional encoding module and a multi-layer perceptron model (MLP). The positional encoding module in INRs may be based on sinusoidal functions, often referred to as Fourier features.

Recent techniques have demonstrated that using multi-layer perceptron models without sinusoidal positional encoding generates blurry outputs, e.g., only preserves low-frequency information. The positional encoding may be removed by replacing the ReLU activation with a periodic or non-periodic activation function in the multi-layer perceptron model. However, in an INR-based Generative Adversarial Network (GAN), using a periodic activation function in a multi-layer perceptron model leads to sub-par performance compared with positional encoding with ReLU-based multi-layer perceptron model Experiments on ReLU-based multi-layer perceptron models show that such models fail to capture the information contained in higher derivatives. This failure to incorporate higher derivative information is due to ReLU's piece-wise linear nature, with second or higher derivatives of ReLU typically being zero. Such results may be interpreted in terms of the Taylor series expansion of a given function. The higher derivative information of a function is included in the coefficients of a higher-order polynomial derived from the Taylor series. Hence, the inability to generate high-frequency information may be due to the ineffectiveness of the ReLU-based multi-layer perceptron model in approximating higher-order polynomials.

Sinusoidal positional encoding with multi-layer perceptron models has been widely used, but the capacity of such INR may be restricted for two reasons. First, the size of the embedding space is limited; hence only a finite and fixed combination of periodic functions may be used, limiting its application to smaller datasets. Second, such an INR design should be mathematically coherent. These INR models may be interpreted as a non-linear combination of periodic functions where periodic functions define the initial part of the network, and the later part is often a ReLU-based non-linear function.

Contrary to this, classical transforms including Fourier, sine, or cosine, may represent an image by a linear summation of periodic functions. However, using only a linear combination of the positional embedding in a neural network is also limiting, resulting in difficulties when representing large and diverse datasets. Therefore, instead of using periodic functions, Poly-INR framework 200 as described herein and the trained AI models trained and output by Poly-INR framework 200, generate an image as a polynomial function of its coordinate location.

One advantage of the polynomial representation provided by Poly-INR framework 200 is the easy parameterization of polynomial coefficients with a multi-layer perceptron model to represent large datasets like ImageNet. Multi-layer perceptron models may approximate lower-order polynomials using a polynomial positional embedding of the form $x^p y^q$ in the first layer to enable the MLP to approximate higher order. However, such a design is limiting, as a fixed embedding size incorporates only fixed polynomial degrees. In addition, the importance of each polynomial degree is not known beforehand for any given image. Poly-INR framework 200 may therefore operate without positional encoding. Rather, the degree of the polynomial may be progressively increased by Poly-INR framework 200 with the depth of the multi-layer perceptron model.

With reference again to FIG. 2A at level-1 210, element-wise multiplication is performed between the feature and affine transformed coordinate location 234B, obtained after every ReLU layer 232. The affine parameters are parameterized by the latent code 216 sampled from a known distribution, from which the networks of Poly-INR framework 200 learn the required polynomial order to represent complex datasets with considerably fewer trainable parameters than all prior known techniques. Utilizing polynomial functions, Poly-INR framework 200 applies a multi-layer perceptron model (MLP) to approximate higher-order polynomials and provides at least the following benefits over prior known techniques: Poly-INR framework 200 enables the training of generative Artificial Intelligence (AI) models that perform comparably with the state-of-the-art CNN-based GAN model (StyleGAN-XL) on the ImageNet dataset with 3-4 times fewer trainable parameters depending on the output resolution. Poly-INR framework 200 outperforms prior known INR models on the Flickr-Faces-HQ (FFHQ) containing 70,000 high-quality PNG images at 1024×1024 resolution and contains considerable variation in terms of age, ethnicity and image background, using a significantly smaller AI model. Qualitative results demonstrate Poly-INR framework 200 performs better than prior known techniques for interpolation, inversion, style-mixing, high-resolution sampling, and extrapolation.

Implicit neural representations: INRs have been widely adopted for 3D scene representation and synthesis. Following the success of Neural Radiance Field (NeRF), there has been a large volume of work on 3D scene representation from 2D images due to the ability of NeRF to reconstruct complex three-dimensional scenes from a partial set of two-dimensional images. INRs have also been used for semantic segmentation, video, audio, and time-series modeling and as a prior for inverse problems. However, most INR approaches either use a sinusoidal positional encoding or a sinusoidal activation function, which limits the INR model capacity for large dataset representation. Unlike prior known INR models and the NeRF technique, Poly-INR framework 200 enables polynomial functions without use of positional encoding.

Generative Adversarial Networks (GANs): GANs have been widely used for image generation and synthesis tasks. Several improvements have been proposed over the original architecture. For example, the popularly used StyleGAN model uses a mapping network to generate style codes which are then used to modulate the weights of the convolutional layers. For instance, StyleGAN improves image fidelity, as well as enhances inversion and image editing capabilities and has been scaled to large datasets like ImageNet, using a discriminator which uses projected features from a pre-trained classifier. More recently, transformer-based models have also been used as generators; however, the self-attention mechanism is computationally costly for achieving higher resolution. Unlike these methods, Poly-INR framework 200 is free of convolution, normalization, and self-attention mechanisms and only uses ReLU and Linear layers to achieve competitive results, but with far fewer parameters.

GANs+coordinates: INRs have also been implemented within generative models. For example, Conditionally-Independent Pixel Synthesis (CIPS) uses Fourier features and learnable vectors for each spatial location as positional encoding and uses StyleGAN-like weight modulation for layers in the multi-layer perceptron model. Similarly, an INR-GAN model uses a multi-scale generator model where a hypernetwork determines the parameters of the multi-layer perceptron model. The INR-GAN model has been further extended to generate an 'infinite'-size continuous image using anchors. However, these INR-based models have only shown promising results on smaller datasets. Conversely, Poly-INR framework 200 scales easily to large datasets like ImageNet owing to the significantly fewer parameters.

Other approaches have combined a Convolutional Neural Network (CNN, or ConvNet) with coordinate-based features. For example, the Local Implicit Image Function (LIIF) and Spherical Local Implicit Image Function (SLIIF) each utilize a CNN-based backbone to generate feature vectors corresponding to each coordinate location. Arbitrary scale image synthesis uses a multi-scale convolution-based generator model with scale-aware position embedding to generate scale-consistent images. The StyleGAN model was further extended by (StyleGAN-3) to use coordinate location-based Fourier features. In addition, StyleGAN-3 utilizes filter kernels equivariant to the coordinate grid's translation and rotation. However, the rotation equivariant version of the StyleGAN-3 model fails to scale to the large size of the ImageNet dataset. Conversely, Poly-INR framework 200, rather than using convolutional layers, uses linear 233 and ReLU 232 layers.

Relation to classical geometric moment: Polynomial functions have been explored earlier in the form of geometric moments for image reconstruction. Unlike the Fourier transform, which uses the sinusoidal functions as the basis, the geometric moment method projects the 2D image on a polynomial basis of the form $x^p y^q$ to compute the moment of order p+q. The moment matching method is generally used for image reconstruction from a given set of finite moments. In moment matching, the image is assumed to be a polynomial function and the coefficients of the polynomial are defined to match the given finite moments. Similar to geometric moments, Poly-INR framework 200 may represent images on a polynomial basis; however, unlike geometric moments, coefficients utilized by Poly-INR framework 200 are learned end-to-end and defined by a deep neural network.

Method:

A class of functions that represent an image are provided according to Equation 1, set forth as follows:

$$G(x, y) = g_{00} + g_{10}x + g_{01}y + \ldots + g_{pq}x^p y^q,$$

where the term (x,y) is the normalized pixel location sampled from a coordinate grid of size (H×W), while the coefficients of the polynomial ($g_{pq}$) are parameterized by a latent vector z sampled from a known distribution and are independent of the pixel location.

Therefore, to form an image, Poly-INR framework 200 evaluates the generator G for all pixel locations (x,y) for a given fixed z, according to Equation 2, set forth below, as follows:

$$I = \{G(x, y; z) \mid (x, y) \in CoordinateGrid(H, W)\},$$

where the term CoordinateGrid $$(H, W) = \left\{\left(\frac{x}{W-1}, \frac{y}{H-1}\right) \middle| 0 \le x < W, 0 \le y < H\right\}.$$

By sampling different latent vectors z, Poly-INR framework 200 generates different polynomials and represents images over a distribution of real images. Poly-INR framework 200 may learn the polynomial defined by Equation 1 using only Linear 233 and ReLU 232 layers. However, the conventional definition of a multi-layer perceptron model usually takes coordinate location 234A as input, processed by a few Linear 233 and ReLU 232 layers. This definition of INR may approximate low-order polynomials and hence only generates low-frequency information.

Although, a positional embedding consisting of polynomials of the form $x^p y^q$ may be utilized to approximate a higher-order polynomial, an INR defined in such a way is limiting since a fixed-size embedding space may contain only a small combination of polynomial orders. Furthermore, Poly-INR framework 200 has no prior indication of which polynomial order will generate any given image. Therefore, Poly-INR framework 200 may progressively increase the polynomial order in synthesis network 230 and let synthesis network 230 learn the required orders. Poly-INR framework 200 may implement such a concept using element-wise multiplication with affine-transformed coordinate location 234B at different levels (e.g., Level-0 205, Level-1 210 at FIG. 2A and Level-9 220 at FIG. 2B).

As depicted at FIGS. 2A and 2B, Poly-INR framework 200 includes both mapping network 215, which takes the latent code z and maps it to affine parameters space W, and synthesis network 230 formed from the multiple different levels (e.g., Level-0 205, Level-1 210, Level-9 220, etc.), which takes the pixel location and generates the corresponding RGB value 231 as depicted at FIG. 2B.

Mapping network: More particularly, mapping network 215 takes latent code (216) represented by the term $z \in \mathbb{R}^{64}$ and maps latent code z 216 to affine parameter space 260 represented by the term $W \in \mathbb{R}^{512}$. Poly-INR framework 200 utilizes mapping network 215 having a pre-trained class embedding 217, which embeds the one hot class label into a 512-dimension vector and concatenates it with latent code z (216). Mapping network 215 may further include a multi-layer perceptron model (MLP) with two layers, which maps latent code z (216) to affine parameter space 260 W. Poly-INR framework 200 utilizes affine parameter space 260 W to generate affine parameters by using additional linear 233 layers; hence the term W represents affine parameters space 260.

Synthesis network: Synthesis network 230 generates the RGB ($\mathbb{R}^3$) value 231 for the given pixel location (x,y). As depicted by FIGS. 2A and 2B, synthesis network 230 includes multiple levels (e.g., Level-0 205, Level-1 210, Level-9 220, etc.). At each level, synthesis network 230 receives affine transformation parameters 235 from mapping network 215 and pixel coordinate location 234A. With reference to FIG. 2A, at level-0 205, Poly-INR framework 200 applies affine transformation on the coordinate grid and inputs the transformed coordinate grid into a Linear 233 layer followed by a Leaky-ReLU 232 layer with negative slope=0.2. At later levels (e.g., Level-1 210, Level-9 220), Poly-INR framework 200 performs element-wise multiplication between the feature from the previous level and the affine-transformed coordinate grid, and then again inputs the affine-transformed coordinate grid to Linear 233 and Leaky-ReLU 232 layers. With the element-wise multiplication at each level, synthesis network 230 has the flexibility to increase the order for x or y coordinate position, or not to increase the order by keeping the affine transformation coefficient $a_j=b_j=0$.

According to one example of Poly-INR framework 200, ten (10) levels were utilized, which was sufficient to generate large datasets like ImageNet. Mathematically, synthesis network 230 may be expressed according to Equation 3, set forth below, as follows:

$$G_{syn} = \ldots \sigma(W_2((A_2X)\odot\sigma(W_1((A_1X)\odot\sigma(W_0(A_0X)))))),$$

where the term $X\in\mathbb{R}^{3\lambda HW}$ is the coordinate grid of size H×W with an additional dimension for the bias, where the term $A_i\in\mathbb{R}^{n\times 3}$ is the affine transformation matrix 240 from mapping network 215 for level-i, where the term $W_i\in\mathbb{R}^{n\times n}$ is the weight of the linear layer at level-i, where the term σ is Leaky-ReLU 232 layer, and where the symbol ⊙ represents element-wise multiplication.

Here n is the dimension of the feature channel in synthesis network 230, which is the same for all levels. For large datasets like ImageNet, the channel dimension n=1024 was utilized, and for smaller datasets like FFHQ, the channel dimension n=512 was utilized. With this definition, Poly-INR framework 200 utilized only Linear 233 and ReLU 232 layers end-to-end and synthesized each pixel independently.

Relation to StyleGAN: StyleGANs may be extended by a specialized formulation of Poly-INR framework 200. By keeping the coefficients ($a_j$, $b_j$) in the affine transformation matrix 240 of x and y coordinate location 234A equal to zero, the bias term $c_j$ would act as a style code. However, affine transformation by Poly-INR framework 200 adds location bias to the style code, rather than just using the same style code for all locations in StyleGAN models. This location bias makes Poly-INR framework 200 flexible in applying a style code only to a specific image region, thus making the subject image more expressive overall.

Poly-INR framework 200 differs from such StyleGAN type models in many aspects. First, Poly-INR framework 200 does not use weight modulation/demodulation or normalizing techniques. Second, Poly-INR framework 200 does not employ low-pass filters or convolutional layers. Third, Poly-INR framework 200 does not inject spatial noise into synthesis network 230 of Poly-INR framework 200. While such techniques could be utilized to extend upon and further improve performance of Poly-INR framework 200, they are optional, thus making the definition of Poly-INR framework 200 straightforward compared to other GAN models.

Experiments:

FIGS. 3A, 3B, 3C, and 3D depict Tables 1A, 1B, 1C, and 1D at elements 301A, 301B, 301C, and 301D, illustrating a quantitative comparison of Poly-INR method with CNN-based generative models on ImageNet datasets, in accordance with aspects of the disclosure. Table 1D provides a comparison of the number of parameters used in all models at various resolutions. The results for prior known methods are derived from the StyleGAN-XL implementation.

The effectiveness of Poly-INR framework 200 was evaluated on two datasets, ImageNet and FFHQ. The ImageNet dataset includes 1.2M images over 1K classes. The FFHQ dataset contains approximately ~70K images of curated human faces.

Utilized variants of Poly-INR framework 200 had 64 dimensional latent space sampled from a normal distribution with mean 0 and standard deviation 1. The affine parameters space W (260) of mapping network 215 was 512 dimensions, and synthesis network 230 included 10 levels with feature dimension n=1024 for the ImageNet dataset and n=512 for the FFHQ dataset. The training scheme of the StyleGAN-XL method was followed using a projected discriminator based on the pre-trained classifiers (DeiT and EfficientNet) with an additional classifier guidance loss.

Poly-INR framework 200 was trained progressively with increasing resolution, e.g., training started at low resolution and training continued to higher resolutions as training progressed. Since the computational cost was less at low resolution, Poly-INR framework 200 was trained for a large number of iterations, followed by training for high resolution. Because Poly-INR framework 200 was already trained at low resolution, fewer iterations resulted in convergence at high resolution. However, unlike StyleGAN-XL, which freezes the previously trained layers and introduces new layers for higher resolution, Poly-INR framework 200 utilized a fixed number of layers and trained all the parameters at every resolution.

Quantitative Results: Poly-INR framework 200 was compared against CNN-based GANs (BigGAN and StyleGAN-XL) and diffusion models (CDM, ADM, ADM-G, and DiT-XL) on the ImageNet dataset. Results are reported on the FFHQ dataset for INR-based GANs (CIPS and INR-GAN).

Quantitative metrics: Inception Score (IS), Frechet Inception Distance (FID), Spatial Frechet Inception Distance (sFID), random-FID (rFID), precision (Pr), and recall (Rec) are utilized for the reporting. For Inception Score, higher is better and the value quantifies the quality and diversity of the generated samples based on the predicted label distribution by the Inception network but does not compare the distribution of the generated samples with the real distribution. For the FID score, lower is better, and the value overcomes the drawback of Inception Score by measuring the Frechet distance between the generated and real distribution in the Inception feature space. Further, sFID uses higher spatial features from the Inception network to account for the spatial structure of the generated image. Like StyleGAN- XL, the rFID score is utilized to ensure that the network is not just optimizing for IS and FID scores and the same randomly initialized Inception network was utilized.

Poly-INR framework 200 was further compared on the precision and recall metrics, where higher is better, measuring how likely the generated sample is from the real distribution.

With reference to FIGS. 3A, 3B, and 3C, Tables 1A, 1B, and 1C (301A, 301B, 301C) summarize the results on the ImageNet dataset at different resolutions of 128×128, 256×256, and 512×512, respectively. The results for prior known techniques were derived from the StyleGAN-XL implementation. The performance of the Poly-INR framework 200 was third best after DiT-XL and StyleGAN-XL on the FID and IS metrics. Poly-INR framework 200 outperformed the ADM and BigGAN models at all resolutions and performed comparably to StyleGAN-XL at resolution of 128×128 and 256×256. As image size increased, the FID score for Poly-INR framework 200 dropped more than StyleGAN-XL. The FID score dropped more due to Poly-INR framework 200 not adding additional layers with the increase in image size.

For example, StyleGAN-XL uses 134.4 million parameters at 64×64 and 168.4 million parameters at 512×512, whereas Poly-INR framework 200 used 46.0 million parameters at every resolution, as reported in Table 1D (301D at FIG. 3D).

Tables 1A, 1B, and 1C (301A, 301B, 301C) show that Poly-INR framework 200 performed comparably to the state-of-the-art CNN-based generative models, even with significantly fewer parameters.

On precision metric, Poly-INR framework 200 performed comparably to other methods; however, the recall value was slightly lower compared with StyleGAN-XL and diffusion models at higher resolution. Again, this is due to the small model size, limiting the capacity of Poly-INR framework 200 to represent finer details at a higher resolution.

FIG. 4 depicts Table 2 at element 401, illustrating a quantitative comparison of Poly-INR framework 200 with CNN and INR-based generative models on FFHQ dataset at 256×256, in accordance with aspects of the disclosure.

Poly-INR framework 200 was compared with other INR-based GANs including CIPS and INR-GAN on the FFHQ dataset. Table 2 (401) shows that Poly-INR framework 200 significantly outperformed CIPS and INR-GAN models, even with a small generator model. Notably, CIPS and INR-GAN outperformed StyleGAN-2 and performed comparably with StyleGAN-XL, using significantly fewer parameters.

Table 2 additionally reports the inference speed of CIPS and INR-GAN models on a Nvidia-RTX-6000 GPU. StyleGANs and INR-GAN use a multi-scale architecture, resulting in faster inference. In contrast, CIPS and Poly-INR models perform all computations at the same resolution as the output image, increasing the inference time.

Figure 5:
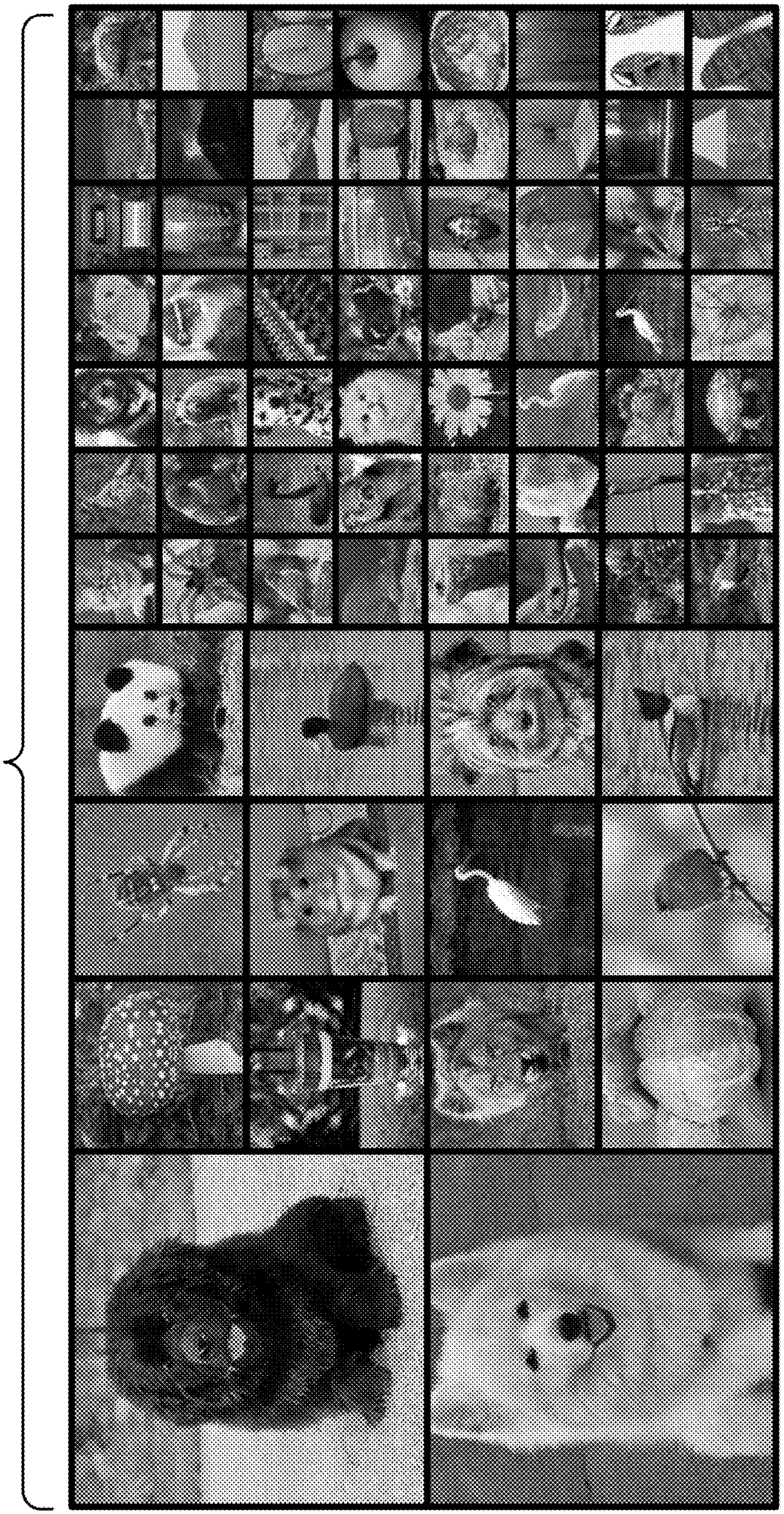
FIG. 5 depicts samples generated by the Poly-INR framework on the ImageNet dataset at various resolutions, in accordance with aspects of the disclosure.

Qualitative Results:

FIG. 5 depicts samples generated by Poly-INR framework 200 on the ImageNet dataset at various resolutions, in accordance with aspects of the disclosure. Poly-INR framework 200 generates images with high fidelity without using convolution, up-sample, or self-attention layers, (e.g., there is no interaction between the pixels).

With reference to FIG. 5, sample images 505 generated by Poly-INR framework 200 trained on 512×512 are depicted for different resolutions. Poly-INR framework 200 was observed to generate diverse images with very high fidelity. Notwithstanding the lack of convolution or self-attention layers, Poly-INR framework 200 generates realistic images over datasets like ImageNet. In addition, Poly-INR framework 200 provides flexibility to generate images at different scales by changing the size of the coordinate grid, making Poly-INR framework 200 efficient when low-resolution images are used for a downstream task. In contrast, CNN-based models generate images only at the training resolution due to the non-equivariant nature of the convolution kernels to image scale.

Figure 6:
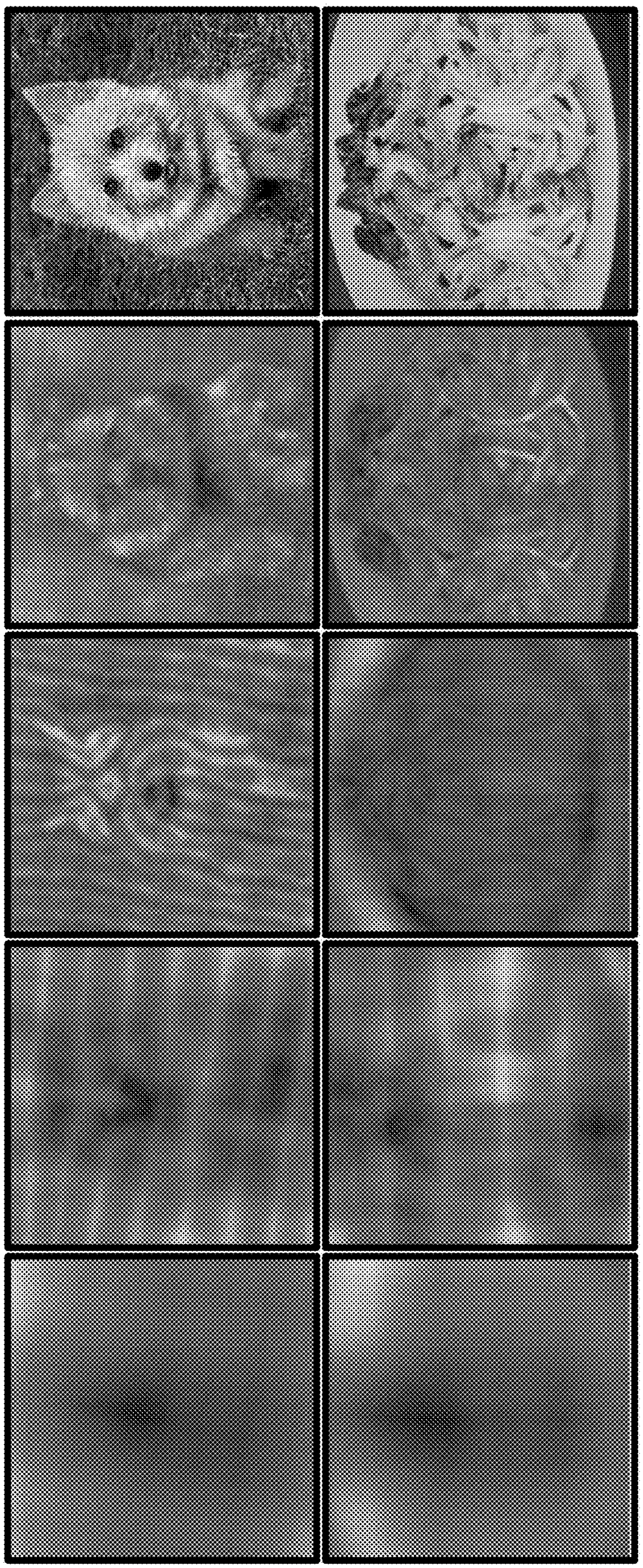
FIG. 6 depicts heat-map visualizations at different synthesis network levels by Poly-INR framework, in accordance with aspects of the disclosure.

Heat-Map Visualization:

FIG. 6 depicts heat-map visualizations at different synthesis network levels 605 by Poly-INR framework 200, in accordance with aspects of the disclosure. At initial levels, Poly-INR framework 200 captures the basic shape of the object, and at higher levels, the finer details of the image are captured.

To visualize a feature as a heat-map, the mean was first computed along the spatial dimension of the feature and used as a weight to sum the feature along the channel dimension. FIG. 6 shows that in the initial levels (0-3), Poly-INR framework 200 forms the basic structure of the object. Meanwhile, in the middle levels (4-6), Poly-INR framework 200 captures the overall shape of objects, and in the higher levels (7-9), Poly-INR framework 200 adds finer details about the object. Results may be interpreted in terms of polynomial order. Initially, Poly-INR framework 200 only approximates low-order polynomials and represents only basic shapes. However, at higher levels, Poly-INR framework 200 approximates higher-order polynomials representing finer details of the image.

Figure 7:
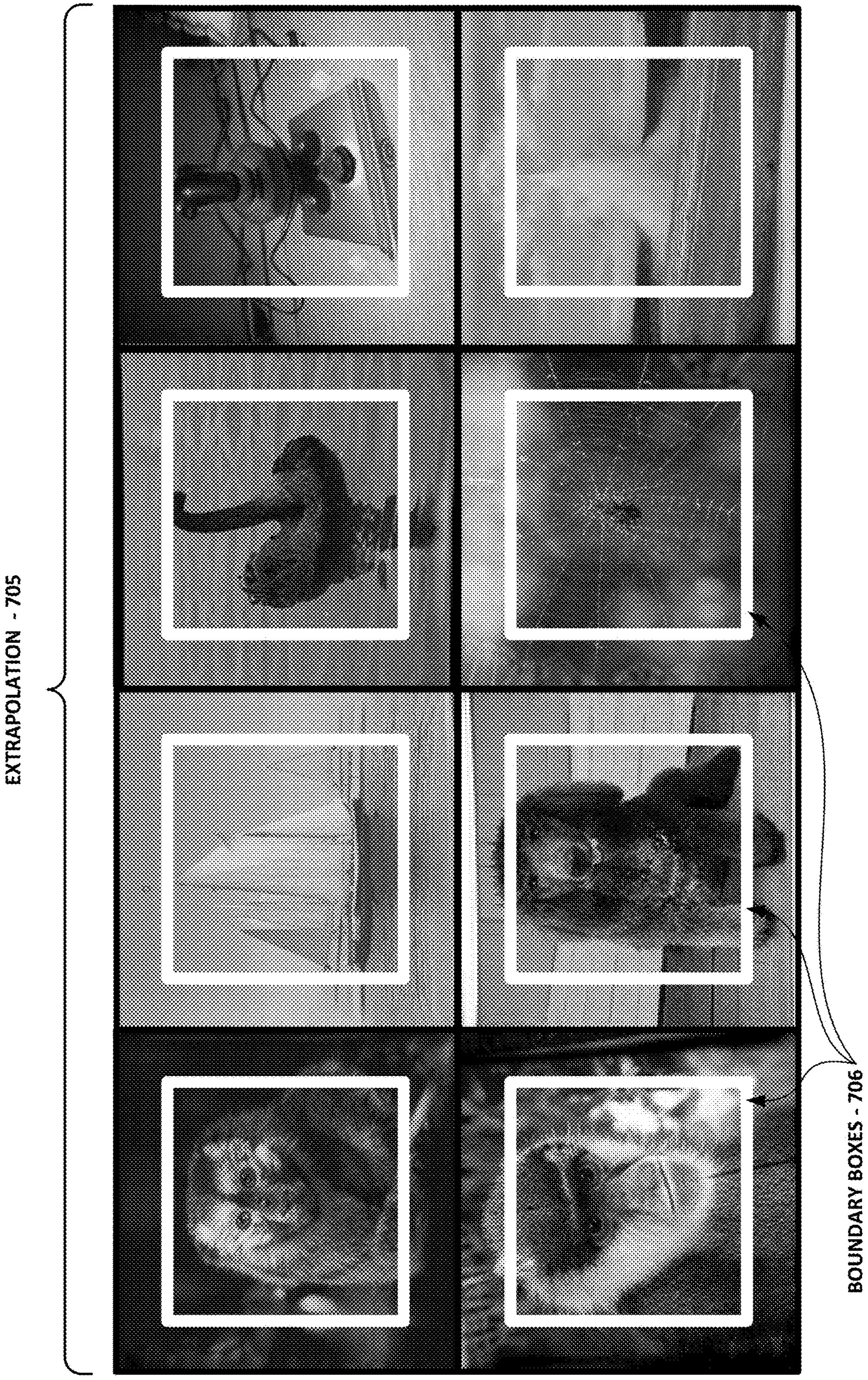
FIG. 7 depicts example images showing extrapolation outside of a boundary, in accordance with aspects of the disclosure.

Extrapolation:

FIG. 7 depicts example images showing extrapolation 705 outside of the boundary boxes 706 as represented by the inset white squares, in accordance with aspects of the disclosure. Poly-INR framework 200 was trained to generate images on the coordinate grid. For extrapolation 705, grid size $[-0.25,1.25]^2$ was utilized. Poly-INR framework 200 generated continuous image detail outside the conventional boundary corresponding to boundary boxes 706 of each image.

The INR model is a continuous function of coordinate location 234A; hence the image is extrapolated by feeding (e.g., inputting) the pixel location outside the conventional image boundary boxes 706. Poly-INR framework 200 may be trained to generate images on the coordinate grid defined by $[0,1]^2$. The grid size $[-0.25,1.25]^2$ is then fed into synthesis network 230 to generate the extrapolated images.

FIG. 7 shows a few examples of extrapolated images. In each example, the region within the inset white square represents the conventional coordinate grid $[0,1]^2$. FIG. 7 shows that Poly-INR framework 200 not only generates a continuous image outside the boundary but also preserves the geometry of the object present within the white square boundary boxes 706. However, in some cases, the model may generate a black or white image border, resulting from the image border present in some real images of the training set.

Sampling at higher-resolution: Another advantage of using Poly-INR framework 200 is the flexibility to generate images at any resolution, even when an AI model output by Poly-INR framework 200 was trained on a lower resolution. For instance, Poly-INR framework 200 is enabled to generate a higher-resolution image by sampling a dense coordinate grid within the $[0,1]^2$ range.

FIG. 8 depicts Table 3 at element 801, providing an FID score (lower the better) evaluated at 512×512 resolution for models trained at a lower resolution and compared against classical interpolation-based up-sampling, in accordance with aspects of the disclosure.

Table 3 (801) shows the FID score evaluated at 512×512 resolution for models trained on the lower-resolution ImageNet dataset. The quality of up-sampled images generated by Poly-INR framework 200 was compared against the classical interpolation-based up-sampling methods. Table 3 (801) shows that Poly-INR framework 200 generates crisper up-sampled images, achieving a significantly better FID score than the classical interpolation-based up-sampling method. However, significant FID score improvement was not observed for Poly-INR framework 200 when trained on 128×128 or higher resolution against the classical interpolation techniques. This result could be due to the limitations of the ImageNet dataset, which primarily includes lower-resolution images than the 512×512 resolution.

Bilinear interpolation was utilized to prepare the training dataset at 512×512. There are currently no other large and diverse datasets like ImageNet with high-resolution images. Such performance may be improved when the model has access to additional higher-resolution images for training. The up-sampling performance was compared with other INR-based GANs by reporting the FID scores at 1024×1024 for models trained on FFHQ-256×256 as follows: PolyINR: 13.69, INR-GAN: 18.51, CIPS:29.59. Poly-INR framework 200 demonstrably provides better high-resolution sampling than the other two INR-based generators.

Figure 9:
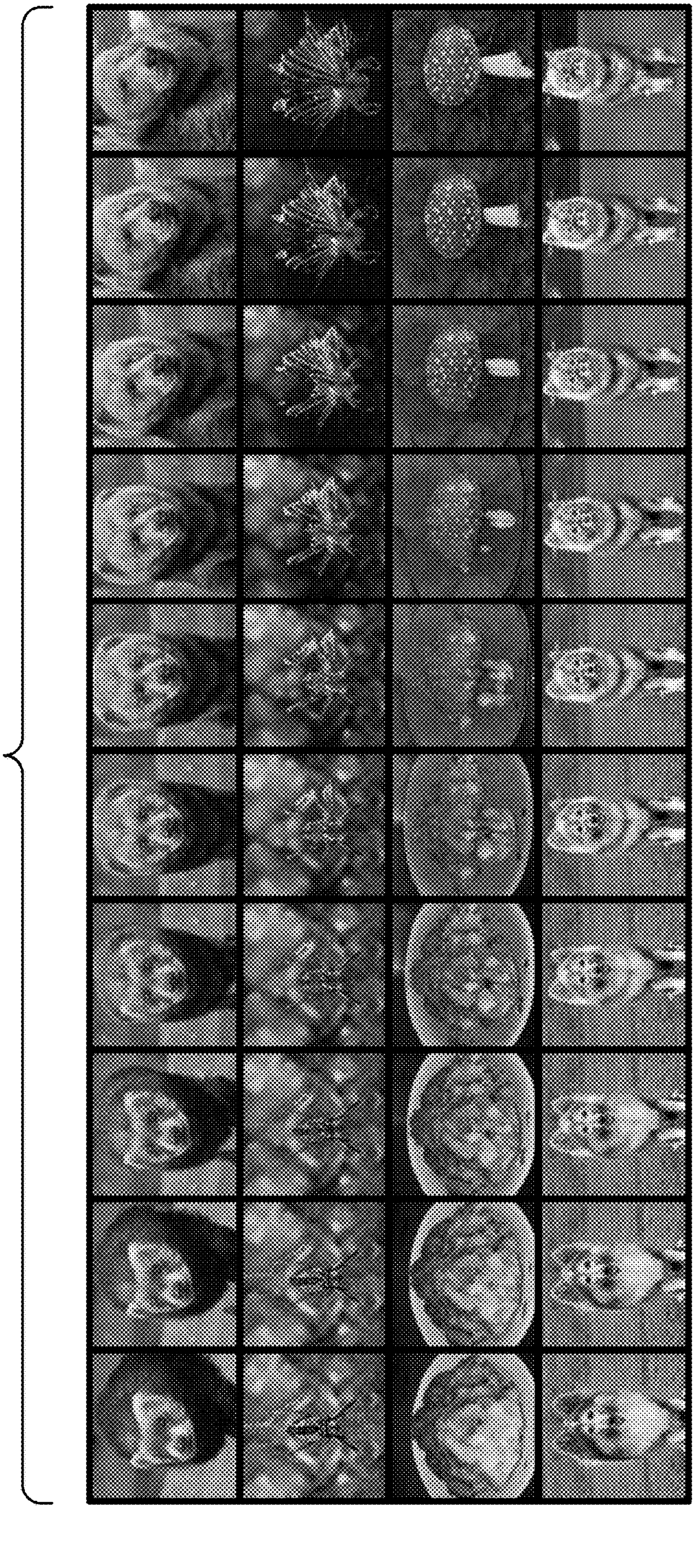
FIG. 9 depicts linear interpolation between two random points, in accordance with aspects of the disclosure.

Interpolation:

FIG. 9 depicts linear interpolation between two random points 905, in accordance with aspects of the disclosure. Poly-INR framework 200 demonstrably provides smooth interpolation even in a high dimension of affine parameters. Poly-INR framework 200 generates high-fidelity images similar to state-of-the-art models like StyleGAN-XL without use of a convolution or self-attention mechanism.

FIG. 9 shows that Poly-INR framework 200 generates smooth interpolation between two randomly sampled images. In the first two rows of the figure, Poly-INR framework 200 interpolates latent space, and in the last two rows, Poly-INR framework 200 directly interpolates between the affine parameters. In synthesis network 230 of Poly-INR framework 200, only the affine transformation parameters 235 depend on the image, and other parameters are fixed for every image. Hence, interpolating in affine parameters space 260 means interpolation in INR space.

Poly-INR framework 200 provides smoother interpolation even in affine parameters space 260 and interpolates with the geometrically coherent movement of different object parts. For example, in the first row of FIG. 9, the eyes, nose, and mouth of the subject move systematically with the whole face.

Figure 10:
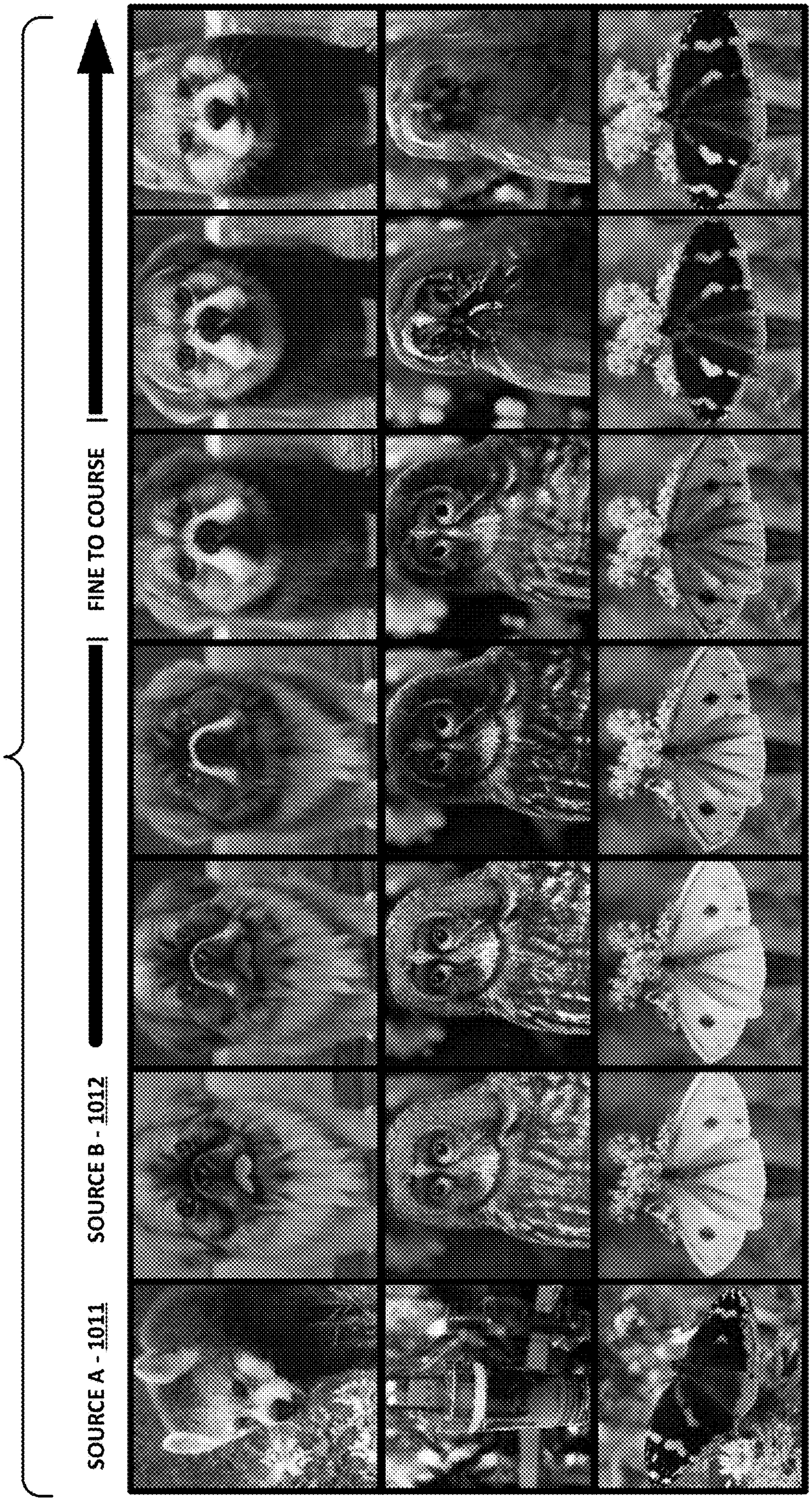
FIG. 10 depicts Source A and source B images generated corresponding to random latent codes and images generated by copying affine parameters of source A to source B at different levels, in accordance with aspects of the disclosure.

Style-Mixing:

FIG. 10 depicts Source A (1011) and source B (1012) images generated corresponding to random latent codes, with the remaining images generated by copying affine parameters 1005 of source A (1011) to source B (1012) at different levels from fine to coarse, in accordance with aspects of the disclosure.

Similar to the ability of StyleGANs, Poly-INR framework 200 successfully transfers the style of one image to another. Poly-INR framework 200 demonstrably generates smooth style mixing using style-mixing regularization during AI model training by Poly-INR framework 200.

For style mixing as depicted here, Poly-INR framework 200 first obtained the affine parameters corresponding to source A (1011) and source B (1012) images and then copied affine parameters 1005 of source A (1011) to source B (1012) at various levels of synthesis network 230. Copying affine transformation parameters 235 from the higher levels (e.g., levels 8 and 9) leads to finer style changes, whereas copying affine transformation parameters 235 from the middle levels (e.g., 7, 6, and 5) leads to coarse style changes. Mixing affine transformation parameters 235 at initial levels changes the shape of the generated object. As depicted by FIG. 10, Poly-INR framework 200 provides smooth style mixing while preserving the original shape of the source B (1012) object.

Figure 11:
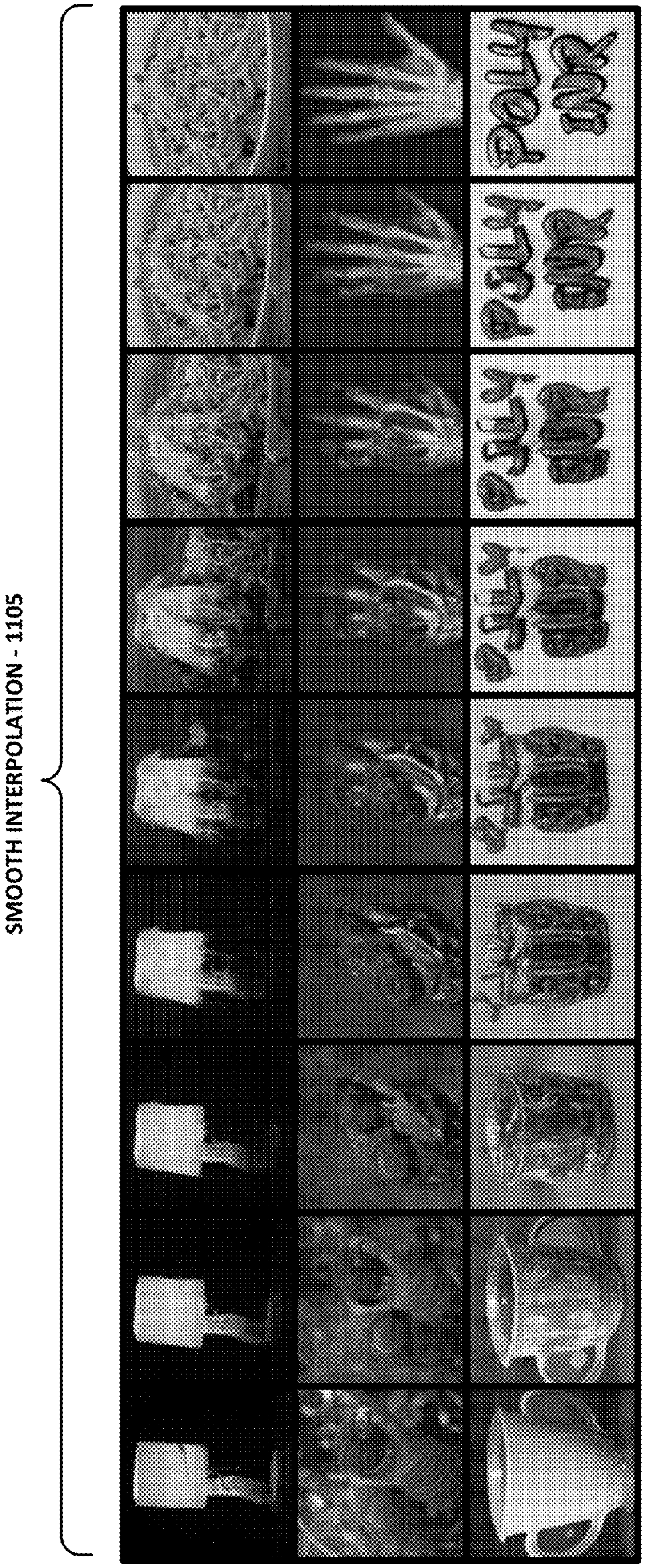
FIG. 11 depicts smooth interpolation generated by Poly-INR framework with embedded images in affine parameters space, in accordance with aspects of the disclosure.

Inversion:

FIG. 11 depicts smooth interpolation 1105 generated by Poly-INR framework 200 with embedded images in affine parameters space 260, in accordance with aspects of the disclosure.

Inversion by prior known GAN models requires embedding a given image into the latent space of the GAN to perform image manipulation. Conversely, Poly-INR framework 200 optimizes affine transformation parameters 235 when performing inversion to minimize the reconstruction loss, keeping parameters of synthesis network 230 fixed. Poly-INR framework 200 may utilize VGG feature-based perceptual loss for optimization. For the quantitative evaluation, Poly-INR framework 200 embedded the ImageNet validation set in the affine parameters space 260. Poly-INR framework 200 effectively embedded images with high PSNR scores (PSNR:26.52 and SSIM:0.76), performing demonstrably better than StyleGAN-XL (with scores of PSNR:13.5 and SSIM:0.33). However, the affine parameters dimension was much larger than the latent space of the StyleGAN-XL model. Even though the dimension of affine transformation parameters 235 was much higher, Poly-INR framework 200 provided smooth interpolation 1105 for the embedded image.

In FIG. 11, the first row and leftmost image is the embedded image from Val set, and the last two rows and rightmost images are the out-of-distribution (OOD) images. Notably, Poly-INR framework 200 provides smooth interpolation 1105 for OOD images.

Figure 12:
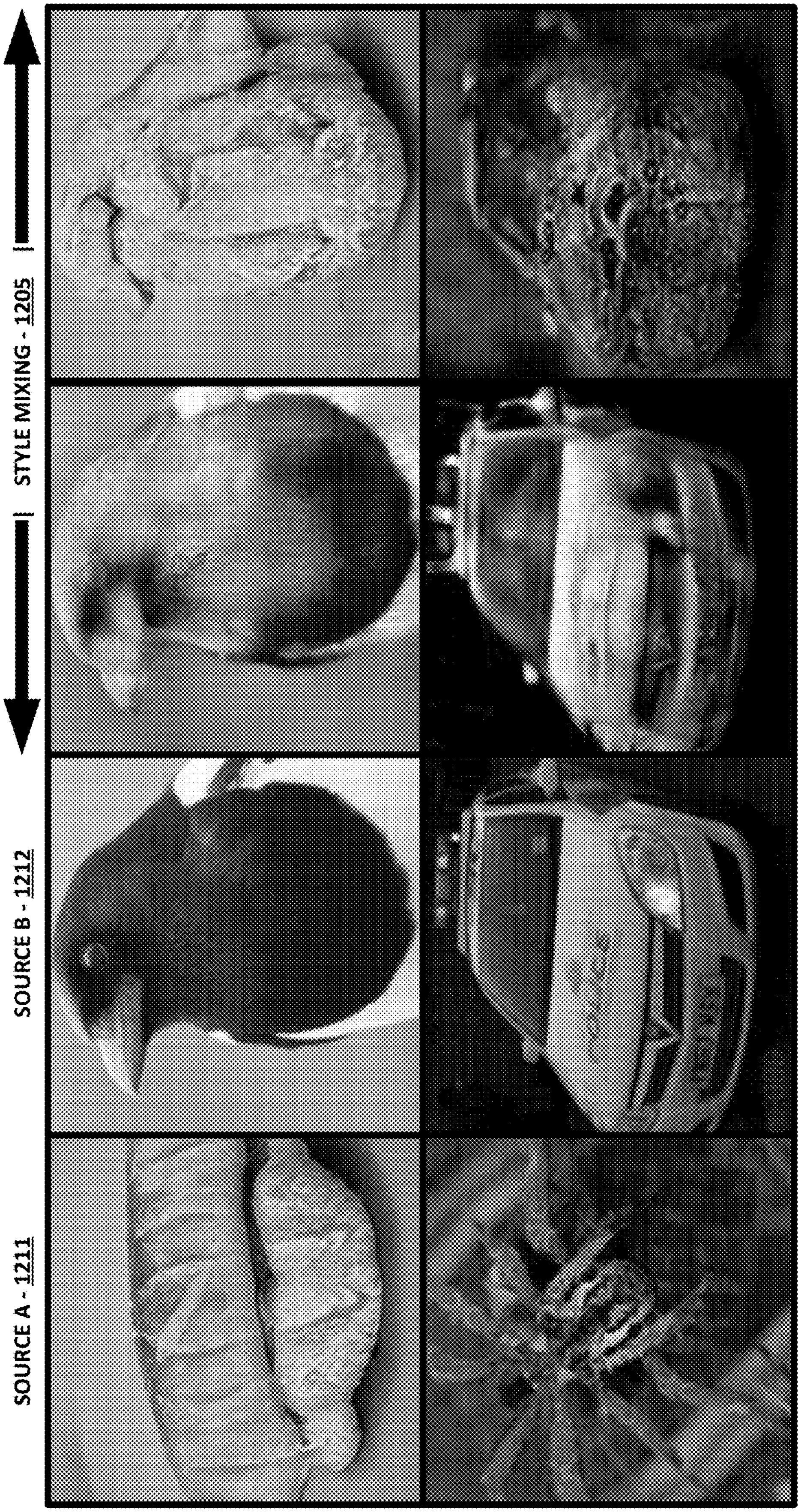
FIG. 12 depicts style-mixing with embedded images in affine parameters space, in accordance with aspects of the disclosure.

FIG. 12 depicts style-mixing 1205 with embedded images in affine parameters space 260, in accordance with aspects of the disclosure. Source B 1212 is the embedded image from the ImageNet validation set, mixed with the style of randomly sampled source A 1211 image. In some cases, the fidelity of the interpolated or style-mixed image with the embedded image is slightly less compared to samples from the training distribution. This may be due to the large dimension of the embedding space, which sometimes makes the embedded point farther from the training distribution. It is possible to improve interpolation quality further by using a tuning inversion method, which fine-tunes the parameters of a generator around the embedded point.

Poly-INR framework 200 is shown to perform comparably to state-of-the-art generative models on large ImageNet datasets without using convolution or self-attention layers resulting in a more straightforward definition. In addition to smooth interpolation and style-mixing, Poly-INR framework 200 provides attractive flexibilities such as image extrapolation and high-resolution sampling.

While Poly-INR framework 200 is described herein with reference to 2D image datasets, Poly-INR framework 200 may be extended to other modalities including 3D datasets. Poly-INR framework 200 may incur higher computation cost compared with CNN-based generator models for high-resolution image synthesis. INR methods generate each pixel independently; hence all the computation takes place at the same resolution. In contrast, a CNN-based generator uses a multi-scale generation pipeline to provide computational efficiency. Common GAN artifacts may be observed in some generated images. For example, in some cases, Poly-INR framework 200 was observed to generate multiple heads and limbs, missing limbs, or object geometry that was not correctly synthesized. CNN-based discriminators may discriminate based only on parts of the object and therefore fail to incorporate the entire shape.

In such a way, Poly-INR framework 200 implements a polynomial function based implicit neural representations for large image datasets while only using Linear 233 and ReLU 232 layers. Poly-INR framework 200 captures high-frequency information and performs comparably to the state-of-the-art CNN-based generative models without using convolution, normalization, up-sampling, or self-attention layers. In experiments, Poly-INR framework 200 outperformed previously proposed positional embedding-based INR GAN models and is demonstrated to be effective for various tasks including interpolation, style-mixing, extrapolation, high-resolution sampling, and image inversion. Additionally, Poly-INR framework 200 may readily be extended to include 3D-aware image synthesis on large datasets like ImageNet.

Figure 13:
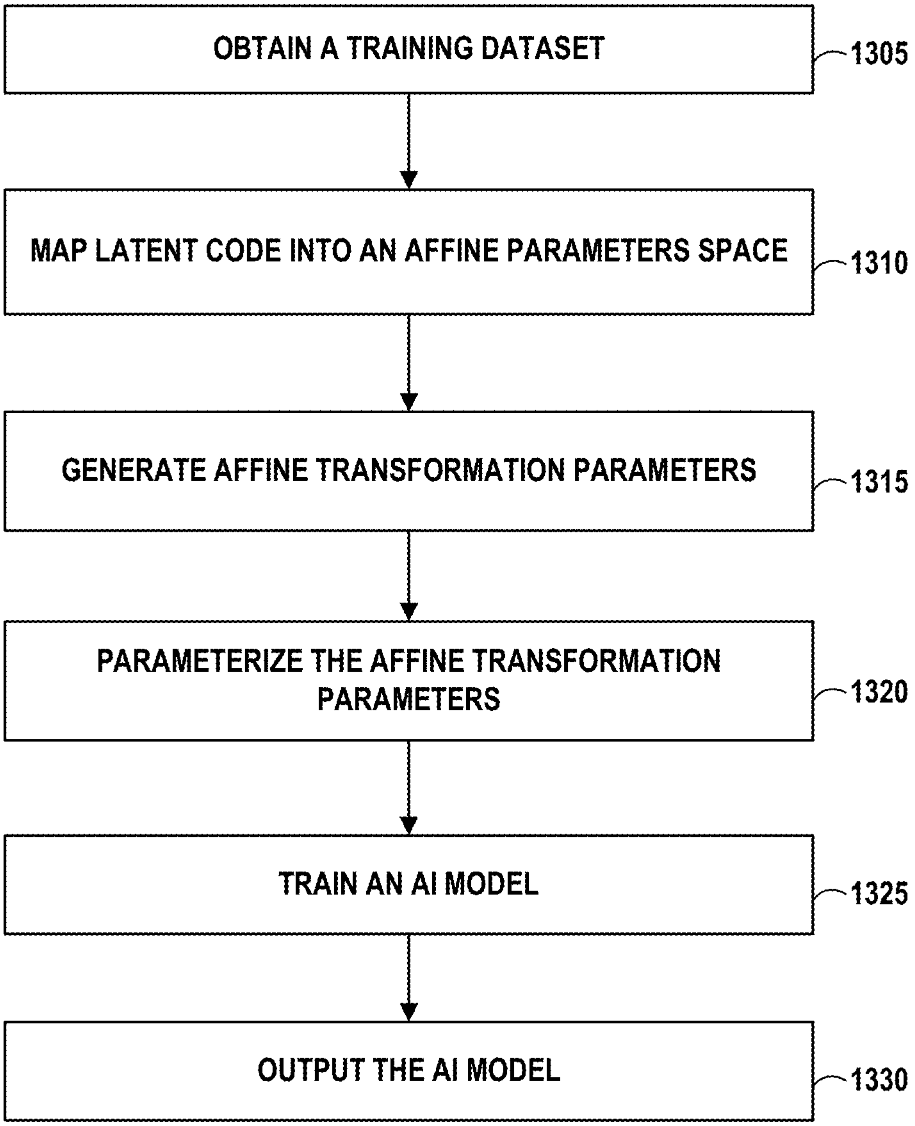
FIG. 13 is a flow chart illustrating an example mode of operation for the computing device to generate polynomial implicit neural representations for large diverse datasets, in accordance with aspects of the disclosure.

FIG. 13 is a flow chart illustrating an example mode of operation for computing device 100 to generate polynomial implicit neural representations for large diverse datasets, in accordance with aspects of the disclosure. The mode of operation is described with respect to computing device 100 and FIGS. 1, 2A, 2B, 3A-3D, 4, 5, 6, 7, 8, 9, 10, 11, and 12.

Computing device 100 may obtain a training dataset (1305). For instance, processing circuitry may execute a Polynomial Implicit Neural Representation generator framework (Poly-INR framework). In such an example, the Poly-INR framework may include at least a mapping network and a synthesis network. Computing device 100 may obtain, by the processing circuitry using the Poly-INR framework, a training dataset having a plurality of input images.

Computing device 100 may map latent code into an affine parameters space (1310). For example, processing circuitry 199 of computing device 100 may map, using the mapping network, latent code extracted from the plurality of input images of the training dataset into an affine parameters space.

Computing device 100 may generate affine transformation parameters (1315). For example, processing circuitry 199 of computing device 100 may generate, using the mapping network, affine transformation parameters from the affine parameters space.

Computing device 100 may parameterize the affine transformation parameters (1320). For example, processing circuitry 199 of computing device 100 may obtain, using the synthesis network from the mapping network, the affine transformation parameters and pixel coordinate locations and parameterize, by the processing circuitry using the Poly-INR framework, the affine transformation parameters using the latent code extracted from the plurality of input images of the training dataset as a known distribution.

Computing device 100 may train an AI model (1325). For example, processing circuitry 199 of computing device 100 may train, using the Poly-INR framework, an AI model to learn a polynomial order representing the training dataset from the affine transformation parameters parameterized.

Computing device 100 may output the AI model (1330).

According to another example, computing device 100 may parameterize, by the processing circuitry using the Poly-INR framework, the affine transformation parameters using a latent vector sampled from the known distribution to be independent of the pixel coordinate locations.

According to another example, computing device 100 may apply, by the processing circuitry using the synthesis network, an affine transformation to a coordinate grid formed from the pixel coordinate locations according to the affine transformation parameters to generate an affine-transformed coordinate grid. According to such an example, computing device 100 may generate, by the processing circuitry using the synthesis network, RGB values for corresponding pixel coordinate locations within the affine-transformed coordinate grid.

According to another example, computing device 100 may generate, by the processing circuitry using the AI model, a new image which forms no part of the training dataset.

According to another example, computing device 100 may generate, by the processing circuitry using the Poly-INR framework, the affine transformation parameters from the affine parameters space utilizing a Rectified Linear Unit (ReLU) layer.

According to another example, computing device 100 may generate, by the processing circuitry using the Poly-INR framework, additional affine transformation parameters from the affine parameters space utilizing two or more linear layers applied by a multi-layer perceptron model of the Poly-INR framework.

According to another example, computing device 100 may embed, by the processing circuitry using the mapping network, a class label into a dimension vector concatenated with the latent code.

According to another example, computing device 100 may transfer, by the processing circuitry using the AI model, a style of a first source image into an object of a second source image without use of style-mixing regularization by the AI model.

According to another example, computing device 100 may generate, by the processing circuitry using the AI model, new interpolated images formed from direct interpolation between the affine transformation parameters for at least a first resolution and a second resolution of the new interpolated images.

According to another example, computing device 100 may generate, by the processing circuitry using the AI model, one or more new extrapolated images having image regions extended beyond an original boundary with a preserved object retained within the original boundary.

For processes, apparatuses, and other examples or illustrations described herein, including in any flowcharts or flow diagrams, certain operations, acts, steps, or events included in any of the techniques described herein may be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with the examples of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

By way of example, and not limitation, such computer-readable storage media may include RAM, ROM, EEPROM, CD-ROM or other optical disk storage, magnetic disk storage, or other magnetic storage devices, flash memory, or any other medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

What is claimed is:

1. A system comprising:

processing circuitry; and non-transitory computer readable media storing instructions that, when executed by the processing circuitry, configure the processing circuitry to:

execute, by the processing circuitry, a Polynomial Implicit Neural Representation generator framework (Poly-INR framework), the Poly-INR framework having at least a mapping network and a synthesis network;

obtain, by the processing circuitry using the Poly-INR framework, a training dataset having a plurality of input images;

map, by the processing circuitry using the mapping network, latent code extracted from the plurality of input images of the training dataset into an affine parameters space;

generate, by the processing circuitry using the mapping network, affine transformation parameters from the affine parameters space;

obtain, by the processing circuitry using the synthesis network, the affine transformation parameters and pixel coordinate locations;

parameterize, by the processing circuitry using the Poly-INR framework, the affine transformation parameters using the latent code extracted from the plurality of input images of the training dataset as a known distribution;

train, by the processing circuitry using the Poly-INR framework, an AI model to learn a polynomial order representing the training dataset from the affine transformation parameters parameterized; and output, by the processing circuitry, the AI model.

2. The system of claim 1, wherein the processing circuitry is further configured to:

parameterize, by the processing circuitry using the Poly-INR framework, the affine transformation parameters using a latent vector sampled from the known distribution to be independent of the pixel coordinate locations.

3. The system of claim 1, wherein the processing circuitry is further configured to:

apply, by the processing circuitry using the synthesis network, an affine transformation to a coordinate grid formed from the pixel coordinate locations according to the affine transformation parameters to generate an affine-transformed coordinate grid; and generate, by the processing circuitry using the synthesis network, RGB values for corresponding pixel coordinate locations within the affine-transformed coordinate grid.

4. The system of claim 1, wherein the processing circuitry is further configured to:

generate, by the processing circuitry using the AI model, a new image which forms no part of the training dataset.

5. The system of claim 1, wherein the processing circuitry is further configured to:
generate, by the processing circuitry using the Poly-INR framework, the affine transformation parameters from the affine parameters space utilizing a Rectified Linear Unit (ReLU) layer.

6. The system of claim 1, wherein the processing circuitry is further configured to:
generate, by the processing circuitry using the Poly-INR framework, additional affine transformation parameters from the affine parameters space utilizing two or more linear layers applied by a multi-layer perceptron model of the Poly-INR framework.

7. The system of claim 1, wherein the processing circuitry is further configured to:
embed, by the processing circuitry using the mapping network, a class label into a dimension vector concatenated with the latent code.

8. The system of claim 1, wherein the processing circuitry is further configured to:
transfer, by the processing circuitry using the AI model, style of a first source image into an object of a second source image without use of style-mixing regularization by the AI model.

9. The system of claim 1, wherein the processing circuitry is further configured to:
generate, by the processing circuitry using the AI model, new interpolated images formed from direct interpolation between the affine transformation parameters for at least a first resolution and a second resolution of the new interpolated images.

10. The system of claim 1, wherein the processing circuitry is further configured to:
generate, by the processing circuitry using the AI model, one or more new extrapolated images having image regions extended beyond an original boundary with a preserved object retained within the original boundary.

11. A method comprising:
executing, by one or more processors of a computing device, a Polynomial Implicit Neural Representation generator framework (Poly-INR framework), the Poly-INR framework having at least a mapping network and a synthesis network;
obtaining, by the one or more processors using the Poly-INR framework, a training dataset having a plurality of input images;
mapping, by the one or more processors using the mapping network, latent code extracted from the plurality of input images of the training dataset into an affine parameters space;
generating, by the one or more processors using the mapping network, affine transformation parameters from the affine parameters space;
obtaining, by the one or more processors using the synthesis network, the affine transformation parameters and pixel coordinate locations;
parameterizing, by the one or more processors using the Poly-INR framework, the affine transformation parameters using the latent code extracted from the plurality of input images of the training dataset as a known distribution;
training, by the one or more processors using the Poly-INR framework, an AI model to learn a polynomial order representing the training dataset from the affine transformation parameters parameterized; and
outputting, by the one or more processors, the AI model.

12. The method of claim 11, further comprising:
parameterizing, by the one or more processors using the Poly-INR framework, the affine transformation parameters using a latent vector sampled from the known distribution to be independent of the pixel coordinate locations.

13. The method of claim 11, further comprising:
applying, by the one or more processors using the synthesis network, an affine transformation to a coordinate grid formed from the pixel coordinate locations according to the affine transformation parameters to generate an affine-transformed coordinate grid; and
generating, by the one or more processors using the synthesis network, RGB values for corresponding pixel coordinate locations within the affine-transformed coordinate grid.

14. The method of claim 11, further comprising:
generating, by the one or more processors using the AI model, a new image which forms no part of the training dataset.

15. The method of claim 11, further comprising:
generating, by the one or more processors using the Poly-INR framework, the affine transformation parameters from the affine parameters space utilizing a Rectified Linear Unit (ReLU) layer; and
generating, by the one or more processors using the Poly-INR framework, additional affine transformation parameters from the affine parameters space utilizing two or more linear layers applied by a multi-layer perceptron model of the Poly-INR framework.

16. A non-transitory computer-readable storage media storing instructions that, when executed, by processing circuitry configure the processing circuitry to:
execute a Polynomial Implicit Neural Representation generator framework (Poly-INR framework), the Poly-INR framework having at least a mapping network and a synthesis network;
obtain, using the Poly-INR framework, a training dataset having a plurality of input images;
map, using the mapping network, latent code extracted from the plurality of input images of the training dataset into an affine parameters space;
generate, using the mapping network, affine transformation parameters from the affine parameters space;
obtain, using the synthesis network, the affine transformation parameters and pixel coordinate locations;
parameterize, using the Poly-INR framework, the affine transformation parameters using the latent code extracted from the plurality of input images of the training dataset as a known distribution;
train, using the Poly-INR framework, an AI model to learn a polynomial order representing the training dataset from the affine transformation parameters parameterized; and
output the AI model.

17. The non-transitory computer-readable storage media comprising of claim 16, wherein the processing circuitry is further configured to:
parameterize, using the Poly-INR framework, the affine transformation parameters using a latent vector sampled from the known distribution to be independent of the pixel coordinate locations.

18. The non-transitory computer-readable storage media comprising of claim 16, wherein the processing circuitry is further configured to:
apply, using the synthesis network, an affine transformation to a coordinate grid formed from the pixel coordinate locations according to the affine transformation parameters to generate an affine-transformed coordinate grid; and generate, using the synthesis network, RGB values for corresponding pixel coordinate locations within the affine-transformed coordinate grid.

19. The non-transitory computer-readable storage media comprising of claim 16, wherein the processing circuitry is further configured to:

generate, using the AI model, a new image which forms no part of the training dataset.

20. The non-transitory computer-readable storage media comprising of claim 16, wherein the processing circuitry is further configured to:

generate, using the Poly-INR framework, the affine transformation parameters from the affine parameters space utilizing a Rectified Linear Unit (ReLU) layer; and generate, using the Poly-INR framework, additional affine transformation parameters from the affine parameters space utilizing two or more linear layers applied by a multi-layer perceptron model of the Poly-INR framework.

* * * * *